(12) United States Patent
Inoue et al.

(10) Patent No.: US 6,583,840 B1
(45) Date of Patent: Jun. 24, 2003

(54) LIQUID CRYSTAL DISPLAY ELEMENT WITH COMB ELECTRODES HAVING REFLECTIVE PROJECTIONS AND PRODUCING METHOD THEREOF

(75) Inventors: Kazuo Inoue, Hirakata (JP); Hiroyuki Yamakita, Osaka (JP); Katsuhiko Kumagawa, Neyagawa (JP); Masanori Kimura, Daito (JP); Akinori Shiota, Hirakata (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/580,171

(22) Filed: May 26, 2000

(30) Foreign Application Priority Data

| May 26, 1999 | (JP) | 11-146084 |
| Jun. 7, 1999 | (JP) | 11-159605 |
| Jun. 8, 1999 | (JP) | 11-160707 |

(51) Int. Cl.⁷ .................................. G02F 1/1343
(52) U.S. Cl. ........................ 349/141; 349/113
(58) Field of Search ................ 349/139, 152, 349/141

(56) References Cited

U.S. PATENT DOCUMENTS

| 5,852,485 A | * 12/1998 | Shimada et al. ......... 349/141 |
| 5,892,562 A | 4/1999 | Yamazaki et al. ......... 349/141 |
| 6,233,031 B1 | * 5/2001 | Ishitaka ................... 349/113 |
| 6,281,952 B1 | * 8/2001 | Okamoto et al. ......... 349/106 |
| 6,356,328 B1 | * 3/2002 | Shin et al. ............... 349/141 |
| 2001/0046017 A1 | * 11/2001 | Niwano et al. ......... 349/141 |

FOREIGN PATENT DOCUMENTS

| JP | 08-286211 | 11/1996 |
| JP | 09-061842 | 3/1997 |
| JP | 09-258265 | 10/1997 |

* cited by examiner

Primary Examiner—Robert H. Kim
Assistant Examiner—Timothy L. Rude
(74) Attorney, Agent, or Firm—Parkhurst & Wendel, L.L.P.

(57) ABSTRACT

A liquid crystal display element comprising a liquid crystal panel which comprises a pair of substrates and liquid crystal material sealed between the pair of substrates and in which pixel electrode parts of pixel electrodes and common electrode parts of common electrodes are alternately formed on a plane of one of the pair of substrates to change alignment of liquid crystal molecules by generating a horizontal (X) electric field in the plane, wherein at least one of the pixel electrode parts and the common electrode parts has a tapered section with respect to a horizontal (X) electric field direction and are transparent. The horizontal (X) electric field causes improved display characteristics, aperture ratio and response speed.

9 Claims, 35 Drawing Sheets

HS Mode

LIQUID CRYSTAL DISPLAY ELEMENT WITH COMB ELECTRODES HAVING REFLECTIVE PROJECTIONS AND PRODUCING METHOD THEREOF

BACKGROUND OF THE INVENTION (1) Technical Field

This invention relates to a liquid crystal display element used for liquid crystal displays, optical shutters, and the like and to a producing method thereof.

(2) Description of the Prior Art

Liquid crystal panels used for the liquid crystal display elements, offering advantages of low-profile, weight saving, low voltage drive-ability and the like, are used for watches, electronic calculators, personal computers, personal word processors and the like.

The TN (Twisted Nematic) type liquid crystal panel is typically used therefore, adopting an operation mode in which electrodes are formed on upper and lower substrates so that liquid crystals can be allowed to switch with application of a vertical electric field vertical to the substrates.

On the other hand, a horizontal electric field application mode has been proposed for expanding the viewing angle of the liquid crystal panel. The horizontal electric field application mode in which pixel electrodes and common electrodes are formed on the same substrate so that liquid crystal molecules can be allowed to operate with application of a horizontal electric field. This application mode is called the IPS (In-Plane-Switching) mode or the comb electrode operation mode (Cf. Liquid Crystal Display Technique: Sangyo Tosho p42).

Modification of the IPS mode has also been proposed, including the FFS mode (Fringe Field Switching Mode) in which the distance between the electrodes is narrowed for driving the liquid crystals and the HS mode (Hybrid Switching Mode) (see FIG. 57) in which the electrodes are formed on the opposing substrate side to use an oblique electric field. In these modified modes also, the horizontal electric field is generated on a plane of the substrate. Accordingly, these oblique electric field application modes are also called herein the horizontal electric field application mode.

Shown in FIGS. 1 and 2 are structural diagrams of a conventional IPS mode of liquid crystal panel. It is supposed herein that the liquid crystal molecules as are initially aligned in parallel to common electrode parts 6 . . . (or pixel electrode parts 8 . . . ) are aligned vertically to the common electrode parts 6 . . . (or the pixel electrode parts 8 . . . ) when a voltage is applied to the common electrode parts 6 . . . and the pixel electrode parts 8 . . . . It is to be noted that the same functional members as those of the present invention described below are designated by the same reference numerals.

In the conventional horizontal electric field application mode, since the common electrode parts 6 . . . and the pixel electrode parts 8 . . . have a flat plate-like shape and a square shape in section, the horizontal electric field is not applied so much to the liquid crystal molecules on the common electrode parts 6 . . . and the pixel electrode parts 8 . . . . Due to this, the conventional horizontal electric field application mode has the problem that the liquid crystals 12 are not allowed to fully operate with application of a voltage, as shown in FIG. 3. Also, since the common electrode parts 6 . . . and the pixel electrode parts 8 . . . of the conventional horizontal electric field application mode are formed of metal such as Al, light is not allowed to pass through the parts over the electrode parts 6 . . . and 8 . . . . Although the liquid crystal molecules over the both electrode parts 6 . . . and 8 . . . are not allowed to operate, since light does not pass through the parts over those electrodes and thus those parts are invisible, this has not been treated as the problem so far.

In consideration of these problems, the method for suppressing reflection over the electrodes in the reflective liquid crystal panel by forming the both electrode parts from transparent conducting material has been proposed (C. Japanese Patent Application Laying open No. 9(1997)-61842). However, since the horizontal electric field is not fully applied to the liquid crystal molecules over the both electrode parts, as mentioned above, the liquid crystal molecules do not operate in the horizontal direction and no effect is produced by simply making the both electrode parts transparent.

Another method has been proposed (Cf. Japanese Patent Application Laying open No. 9(1997)-171194) in which the pixel electrode parts and the common electrode parts are formed into a curved form in section. This proposal aims to provide improved rising characteristics of the liquid crystals with continuous application of the electric field. This is because the vertical electric field is so strong that the horizontal electric field cannot fully be applied to the liquid crystals. However, substantial improvement in operation of liquid crystal molecules over the both electrode parts cannot be achieved by simply forming the both electrode parts into the curved section. Also, since this proposed method has no intention of making the both electrodes transparent, improvement in aperture ratio cannot be achieved, either. In addition, this method of forming the both electrode parts themselves into the curved form in section has the additional problem of production difficulty.

Further, still another method has been proposed (Cf. Japanese Patent Application Laying open No. 8(1996)-286211) in which one of the pixel electrode parts and the common electrodes are formed into an inverted V-shape such that reflection by the surfaces of the electrodes can allow incident light to be gathered into their apertures. However, since the electrodes require light to be gathered into the apertures, the electrodes cannot be formed by the transparent electrodes. On the contrary, they are formed of high reflectivity material such as Al, Cu or the like. Because of this, improved aperture ratio cannot be produced. Besides, since the light must be entered from a direction of an apex of the V-shape, this method involves many practical problems. In addition, since the reflective surfaces of the electrodes have an inverted V-shape or an inverted U-shape in section, as shown in FIG. 4, the outgoing angle ($\theta 0$ of FIG. 4) is limited to a definite range by a cone angle $\alpha$ of the inverted V shape or inverted U shape, so that the viewing angle is narrowed. In other words, according to the liquid crystal display element mentioned above, since the reflective surface having the inverted V-shaped or inverted U-shaped section produces directed reflected light and sets limits to the viewing angle, there remains the problem that the horizontal electric field application mode (IPS) cannot fully bring out its advantage of expanding the viewing angle.

Furthermore, yet another method has been proposed (Cf. Japanese Patent Application Laying open No. 9(1997)-258265) in which the pixel electrode parts and the common electrode parts are formed on top surfaces and slant surfaces of layer insulation films. However, this proposal described clearly that the both electrode parts are not made transparent. Also, this proposal is totally silent about improvement in speed of response.

SUMMARY OF THE INVENTION

Accordingly, it is an object of the present invention to provide a liquid crystal display element and a producing method thereof that can be intended to produce improved display characteristics by an application of horizontal electric field to liquid crystals over electrodes to a sufficient extent.

It is another object of the present invention to provide a liquid crystal display element and a producing method thereof that can produce a bright display by improvement in aperture ratio and also increased speed of response.

Further, it is still another object of the present invention to provide a liquid crystal display element and a producing method thereof that can produce a broad viewing angle.

The above-mentioned objects can be accomplished by the present invention which provides a liquid crystal display element comprising a liquid crystal panel which comprises a pair of substrates and liquid crystals sealed off in between the pair of substrates and which changes alignment of the liquid crystals by a horizontal electric field being generated in a plane of one of the pair of substrates, wherein a plurality of striped projections and depressions are formed on the plane of the substrate in which the horizontal electric field is generated; wherein pixel electrode parts of pixel electrodes and common electrode parts of common electrodes are alternately formed on either only side faces of striped projection parts of the striped projections and depressions or the side faces and top portions of the striped projection parts of the striped projections and depressions; and wherein at least one of the pixel electrode parts and the common electrode parts is transparent.

With this construction, in which the pixel electrode parts and the common electrode parts are formed on only side faces of striped projection parts of the striped projections and depressions or on the side faces and top portions of the striped projection parts of the striped projections and depressions, the electric field is also applied to a region over the both electrodes parts (i.e., the horizontal electric field to a sufficient extent). This enables the liquid crystal molecules over the both electrodes to be activated to thereby produce improved display characteristics. Also, since at least one of the both electrodes is transparent, light is prevented from being cut off by the electrode parts. This can produce significantly improved aperture ratio and also can prevent decrease in the aperture ratio even when the distances between the electrode parts are narrowed. This enables the distances between the electrodes to be narrowed, thus producing increased speed of response of the liquid crystals.

The pixel electrode parts and the common electrode parts should be formed on only side faces of striped projection parts, rather than on the side faces and top portions of the striped projection parts of the striped projections and depressions. This is because, when the pixel electrode parts are formed on the top portions of the striped projection parts as well, the electric field is applied upwardly (vertically), while on the other hand, when the pixel electrode parts are formed on only the side faces of the striped projection parts, the electric field is applied solely across the pixel electrode parts and the common electrode parts (only in a horizontal direction).

The striped projections and depressions may be formed on an insulation film.

The insulation film may be composed of a color filter layer.

This structure can eliminate the need to form an additional color filter and thus can eliminate the need for any margin for sticking the color filter on, thus producing further increased aperture ratio.

The insulation film may be transparent.

This structure is capable for a transmission liquid crystal display element and also can prevent decrease in the aperture ratio.

Preferably, the insulation film have a film thickness of 1 $\mu$m or more.

The reasons for this limitation are that the film thickness of the insulation film of 1 $\mu$m or more can substantially absorb irregularity of a surface of the substrate forming thereon the insulation film to produce a smooth surface of the insulation film and that the film thickness of 1 $\mu$m or more is desirable for reliable insulation performance of the insulation film.

In a case where the pixel electrode parts and the common electrode parts are alternately formed on the side faces of the striped projection parts of the striped projections and depressions, a distance between two adjoining electrode parts at the top of each striped projection part is preferably limited to not more than 6 $\mu$m.

The reason for this limitation is that when the distance between the two adjoining electrodes exceeds 6 $\mu$m, the both electrode parts are too short to allow the electric field to be applied across them to a sufficient extent.

An aspect ratio in the striped projection part may be limited to be not more than 2.5, or preferably not more than 1.5.

The reason for this limitation is that when the aspect ratio exceeds 2.5, opposing areas of the both electrode parts are reduced, such that the horizontal electric field is not applied so much across the both electrode parts.

A ratio of a length of the pixel electrode parts or common electrode parts to a length of an oblique plane of the striped projections and depressions may be limited to not more than 0.5.

The reason for this limitation is than when the ratio of a length of the pixel electrode parts or common electrode parts to a length of an oblique plane of the striped projections and depression exceeds 0.5, the state of the horizontal electric field is sometimes disordered.

Light may be allowed to enter from an array substrate side of the both substrates.

A liquid crystal display element may include multiple layers of liquid crystal panels.

The above-mentioned objects can be accomplished by the present invention which provides a method of producing a liquid crystal display element comprising a first step of forming scan signal lines, video signal lines and semiconductor layers on one of a pair of substrate; a second step of forming an insulation layer having thereon a plurality of projections and depressions on the scan signal lines, the video signal lines and the semiconductor layers; and a third step of forming pixel electrode parts of pixel electrodes and common electrode parts of common electrodes, at least one of which is transparent, on only side faces of striped projection parts of the striped projections and depressions or on the side faces and top portions of the striped projection parts of the striped projections and depressions.

With this method, since the striped projections and depressions (curved section) are formed on the insulation film which is the base of the both electrode parts, rather than the both electrode parts themselves being formed to have a curved section, the liquid crystal display element capable of producing the operation and effect as set forth in Embodiment 1 can be produced with ease.

In the second step of the above-mentioned method, said insulation film is formed by photosensitive resin being applied and then subjected to exposure while or after being pressed by a mold having thereon projections and depressions.

The process step as mentioned above can facilitate the production of the insulation film having the striped projections and depression thereon. The resin used for the insulation film is not limited to the photosensitive resin. Thermosetting resin and the like may be used for the insulation film.

The insulation film may be formed by a color filtering layer.

This can facilitate the production of the liquid crystal display element including the color filtering layer as set forth in Embodiment 3.

The insulation film may be formed of transparent material.

This can facilitate the production of the liquid crystal display element including the transparent insulation layer as set forth in Embodiment 4.

The above-mentioned objects can be accomplished by the present invention which provides a liquid crystal display element comprising a liquid crystal panel which comprises a pair of substrates and liquid crystals sealed off in between the pair of substrates, and a liquid crystal panel in which pixel electrode parts of pixel electrodes and common electrode parts of common electrodes are alternately formed on a plane of one of the pair of substrates and to change alignment of liquid crystal molecules by generating a horizontal electric field in the plane, wherein at least one of the pixel electrode parts and the common electrode parts has a tapered section with respect to a horizontal electric field direction and is transparent.

With this construction, since the electric field is applied to a region over at least either of the both electrodes parts (the horizontal electric field is applied thereto to a sufficient extent), the liquid crystal molecules over the electrode parts can also be activated and thereby the display characteristics can be improved. Also, since at least one of the both electrodes is transparent, light is prevented from being cut off by the electrode parts. This can produce significantly improved aperture ratio and also can prevent decrease in the aperture ratio even when the distances between the electrode parts are narrowed. This enables the distances between the electrodes to be narrowed, thus producing increased speed of response of the liquid crystals.

The pixel electrode parts or the common electrode parts may have a cone angle of 20 degree or more to less than 90 degree.

The reason for this limitation is that the cone angle of 20 degree or more can produce a large horizontal electric field.

The pixel electrode parts or the common electrode parts may have a cone angle of 20 degree or more to less than 90 degree.

The reason for this limitation is that the cone angle of 45 degree or more can produce a significantly large horizontal electric field.

A distance between two adjoining electrodes of the pixel electrode parts and the common electrode parts may be limited to not more than 6 $\mu$m.

With this limitation, since the transparent electrode parts can allow light to be prevented from being cut off by the electrode parts, the distances between the electrodes can be narrowed, while preventing the reduction of aperture ration. Thus, the speed of response of the liquid crystals can be increased so that moving images can be well displayed.

The pixel electrode parts or the common electrode parts may have a triangular section with respect to a horizontal electric field direction.

With this construction, since at least either of the both electrode parts has a triangular section having a taper such that the electric field can be applied to the region over the electrodes (the horizontal electric field is applied thereto to a sufficient extent), the liquid crystal molecules over the electrode parts can also be activated and thereby the display characteristics can be improved. The apex angle at the top of the triangular section is preferably not more than 135 degree, further preferably, not more than 110 degree.

The pixel electrode parts or the common electrode parts may have a trapezium section with respect to a horizontal electric field direction.

With this construction, since at least either of the electrode parts has a trapezium section having a taper such that the electric field can be applied to the region over the electrodes (the horizontal electric field is applied thereto to a sufficient extent), the liquid crystal molecules over the electrode parts can also be activated and thereby the display characteristics can be improved. The smaller the ratio of A/B is, the higher the contrast is, so the ratio of A/B is preferably set to be not more than $\frac{2}{3}$, or further preferably not more than $\frac{1}{2}$.

The pixel electrode parts and the common electrode parts may be formed on an insulation film so that the electrode parts and the common electrode parts can be on the same plane.

This arrangement of the insulation film can provide an increased aperture ratio of the liquid crystal display panel and simultaneously an enlarged opposing area of the pixel electrode parts and the common electrode parts. This can allow the horizontal electric field to be easily applied to the liquid crystal molecules to produce promoted activity of the liquid crystal molecules.

The insulation film may have a film thickness of 1 $\mu$m or more.

The reasons for this limitation are that the film thickness of the insulation film of 1 $\mu$m or more can substantially absorb irregularity of a surface of the substrate forming thereon the insulation film to produce a smooth surface of the insulation film and that the film thickness of 1 $\mu$m or more is desirable for reliable insulation performance of the insulation film.

The insulation film may be formed by a color filtering layer.

This structure can eliminate the need to form an additional color filter and thus can eliminate the need for any margin for sticking the color filter on, thus producing a further increased aperture ratio.

The above-mentioned objects can be accomplished by the present invention which provides a liquid crystal display element comprising a liquid crystal panel which comprises a pair of substrates and liquid crystals sealed off in between the pair of substrates and in which pixel electrode parts of pixel electrodes and common electrode parts of common electrodes are alternately formed on a plane of one of the pair of substrates to change alignment of liquid crystal molecules by generating a horizontal electric field in the plane, wherein at least one of the pixel electrode parts and the common electrode parts is formed on a transparent insulation layer having tapered section with respect to a horizontal electric field direction and is formed by transparent conductive film.

With this construction, since the electric field is applied to a region over at least either of the both electrodes parts (the horizontal electric field is applied thereto to a sufficient extent), the liquid crystal molecules over the electrode parts can also be activated and thereby the display characteristics can be improved. Also, since at least one of the both electrodes is transparent, light is prevented from being cut off by the electrode parts, thus producing significantly improved aperture ratio. In addition, since at least either of the pixel electrode parts and the common electrode pars are formed in a film-like form on the a transparent insulation layer having tapered section with respect to a horizontal electric field direction, electric resistance is reduced, so that the electric field is applied to the liquid crystal molecules with ease, to activate the liquid crystal molecules with further ease.

A distance between two adjoining electrodes of the pixel electrode parts and the common electrode parts may be limited to not more than 6 µm.

With this limitation, since the transparent electrode parts can allow light to be prevented from being cut off by the electrode parts, the distances between the electrodes can be narrowed, while preventing the reduction of aperture ratio. Thus, increase in the speed of response can be produced so that moving images can be well displayed.

The transparent insulation layer may have a triangular section with respect to a horizontal electric field direction.

With this construction, since the transparent insulation layer has a triangular section with respect to a horizontal electric field direction, the electric field is applied to the region over the electrodes on the transparent insulation layer (in other words, the horizontal electric field is applied thereto to a sufficient extent). This can cause the liquid crystal molecules over the electrode parts to be activated and thereby the display characteristics can be improved. The apex angle at the top of the triangular section is preferably not more than 135 degree, further preferably, not more than 110 degree.

The transparent insulation layer may have a trapezium section with respect to a horizontal electric field direction.

With this construction, since the transparent insulation layer has a trapezium section with respect to a horizontal electric field direction, the electric field is applied to a region over the electrodes on the transparent insulation layer (in other words, the horizontal electric field is applied thereto to a sufficient extent). This causes the liquid crystal molecules over the electrode parts to be activated and thereby the display characteristics can be improved. The smaller the ratio of A/B is, the higher the display performance (contrast) is, so the ratio of A/B is preferably set to be not more than ⅔, or further preferably not more than ½.

The insulation layer may have a cone angle of 20 degree or more to less than 90 degree.

The reason for this limitation is that the cone angle of 20 degree or more can produce a large horizontal electric field.

The insulation layer may have a cone angle of 45 degree or more to less than 90 degree.

The reason for this limitation is that the cone angle of 45 degree or more can produce a significantly large horizontal electric field.

The transparent insulation layer may be formed on an insulation film so that the pixel electrode parts and the common electrode parts formed on the transparent insulation layer can be on the same plane.

This arrangement of the insulation film can provide an increased aperture ratio of the liquid crystal display panel and simultaneously an enlarged opposing area of the pixel electrode parts and the common electrode parts. This can allow the horizontal electric field to be easily applied to the liquid crystal molecules to produce promoted activity of the liquid crystal molecules.

The insulation film may have a film thickness of 1 µm or more.

The reasons for this limitation are that the film thickness of the insulation film of 1 µm or more can substantially absorb irregularity of a surface of the substrate forming thereon the insulation film to produce a smooth surface of the insulation film and that the film thickness of 1 µm or more is desirable for reliable insulation performance of the insulation film.

The insulation film may be formed by a color filtering layer.

This structure can eliminate the need to form any additional color filter and thus can eliminate the need for any margin for sticking the color filter thereon, thus producing a further increased aperture ratio.

The above-mentioned objects can be accomplished by the present invention which provides a method of producing a liquid crystal display element comprising a liquid crystal panel which comprises a pair of substrates and liquid crystals sealed off in between the pair of substrates, and a liquid crystal panel in which pixel electrode parts of pixel electrodes and common electrode parts of common electrodes are alternately formed on a plane of one of the pair of substrates to change alignment of liquid crystal molecules by generating a horizontal electric field in the plane, the producing method comprising: a first step of forming common electrode parts of the common electrodes and the pixel electrode parts of the pixel electrodes; and a second step of forming at least one of the common electrode parts of the common electrodes and the pixel electrode parts of the pixel electrodes to have a tapered section with respect to a horizontal electric field direction.

This method, by which the electrodes having a tapered section with respect to a horizontal electric field direction are formed, can facilitate the production of the liquid crystal display element having the operation and effects as set forth in Embodiment 15.

The above-mentioned objects can be accomplished by the present invention which provides a method of producing a liquid crystal display element comprising a liquid crystal panel which comprises a pair of substrates and liquid crystals sealed off in between the pair of substrates and in which pixel electrode parts of pixel electrodes and common electrode parts of common electrodes are alternately formed on a plane of one of the pair of substrates to change alignment of liquid crystal molecules by generating a horizontal electric field in the plane, the producing method comprising: a first step of forming a transparent insulation layer in a place in which at least one of the common electrode parts of the common electrodes and the pixel electrode parts of the pixel electrodes is formed; a second step of forming the transparent insulation layer to have a tapered section with respect to a horizontal electric field direction; and a third step of forming at least one of the common electrode parts and the pixel electrode parts on the insulation layer.

This method, by which the transparent insulation layer having a tapered section with respect to a horizontal electric field direction is formed and the electrodes are formed on the transparent insulation layer, can facilitate the production of the liquid crystal display element having the operation and effects as set forth in Embodiment 26.

The above-mentioned objects can be accomplished by the present invention which provides a liquid crystal display element in which liquid crystals are sandwiched between at least a pair of substrates and pixel electrodes having a plurality of pixel electrode parts and common electrodes having a plurality of common electrode parts are formed on at least one of the substrates and which changes alignment of liquid crystal molecules by applying a voltage across the pixel electrodes and the common electrodes, characterized in that at least one of electrode parts of the pixel electrodes and/or the common electrodes forms thereon two or more separate projections.

With this construction, the reflected light is prevented from being so directional as to limit the viewing angle. Therefore, the liquid crystal display element of a substantially high aperture ratio and high brightness can be obtained, without spoiling the characteristic of the horizontal electric field application mode (IPS) of a broad viewing angle.

The projections may be made of photosensitive resin material.

This construction can facilitate the production of the liquid crystal display element having the effects mentioned above.

At least one of the projections may be a form of two or more protuberances of different height being combined together.

This construction can bring out the effects mentioned above with increasing effect.

The protuberances may be limited in shape such that light incident on the projections from the same direction can outgo at different outgoing directions.

The protuberances may be different in area from each other.

The projections may each be different in cone angle.

With this construction, the reflected light is prevented from being directional as to limit the viewing angle. Therefore, the liquid crystal display element of a substantially high aperture ratio and high brightness can be obtained, without spoiling the characteristic of the horizontal electric field application mode (IPS) of a broad viewing angle.

At least one of the projections may have a height required to extend between the pair of substrates.

This construction can provide advantages of preventing the array substrate from being damaged by e.g. bead-like spacers moving in the panel and preventing deterioration in contrast and image quality such as distinguishing dazzle resulting from occurrence of chromatic irregularity at the positions of spacers.

The projections may vary in size in accordance with a distance from a center of a pixel.

One of the common electrodes and the pixel electrodes may have the projections which increase in size in accordance with a distance from a center of the pixel and the other of the common electrodes and the pixel electrodes may have the projections which decrease in size in accordance with a distance from a center of the pixel.

With this structure, since a turning direction of the liquid crystal molecules is reversed when a voltage is applied to the liquid crystal molecules, the shift in color tone is offset with each other and thereby dependency of the color tone due to the orientation can be reduced to a large extent. Thus, the coloring that is caused by the conventional horizontal electric field application mode can be prevented.

At least one of the pixel electrodes or the common electrodes may be formed of transparent conductive material.

At least one of the pixel electrodes or the common electrodes may be formed of light reflection functional material.

With this construction, all rays of incident light are allowed to reflect and outgo from the panel, irrespective of angle of incidence. Accordingly, the reflection loss can be decreased and the utility efficiency of light is enhanced. In addition, since similar effect is obtained for the outside light incident from surrounding environment, the utility efficiency of light can further be enhanced.

The above-mentioned objects can be accomplished by the present invention which provides a liquid crystal display element in which liquid crystals are sandwiched between at least a pair of substrates and pixel electrodes having a plurality of pixel electrode parts and common electrodes having a plurality of common electrode parts are formed on at least one of the substrates and which changes alignment of liquid crystal molecules by applying a voltage across the pixel electrodes and the common electrodes, characterized in that at least one electrode parts of the pixel electrodes and/or the common electrodes are formed into such a shape that incident rays of light can reflect diffusely.

At least one of the projections may have a form of two or more protuberances of different height being combined together.

The projections may each be different in cone angle.

DESCRIPTION OF THE PREFERRED EMBODIMENTS

The present invention will be described in detail by way of illustrative examples with reference to the accompanying drawings.

FIRST EMBODIMENT

EXAMPLE 1

Figure 5:
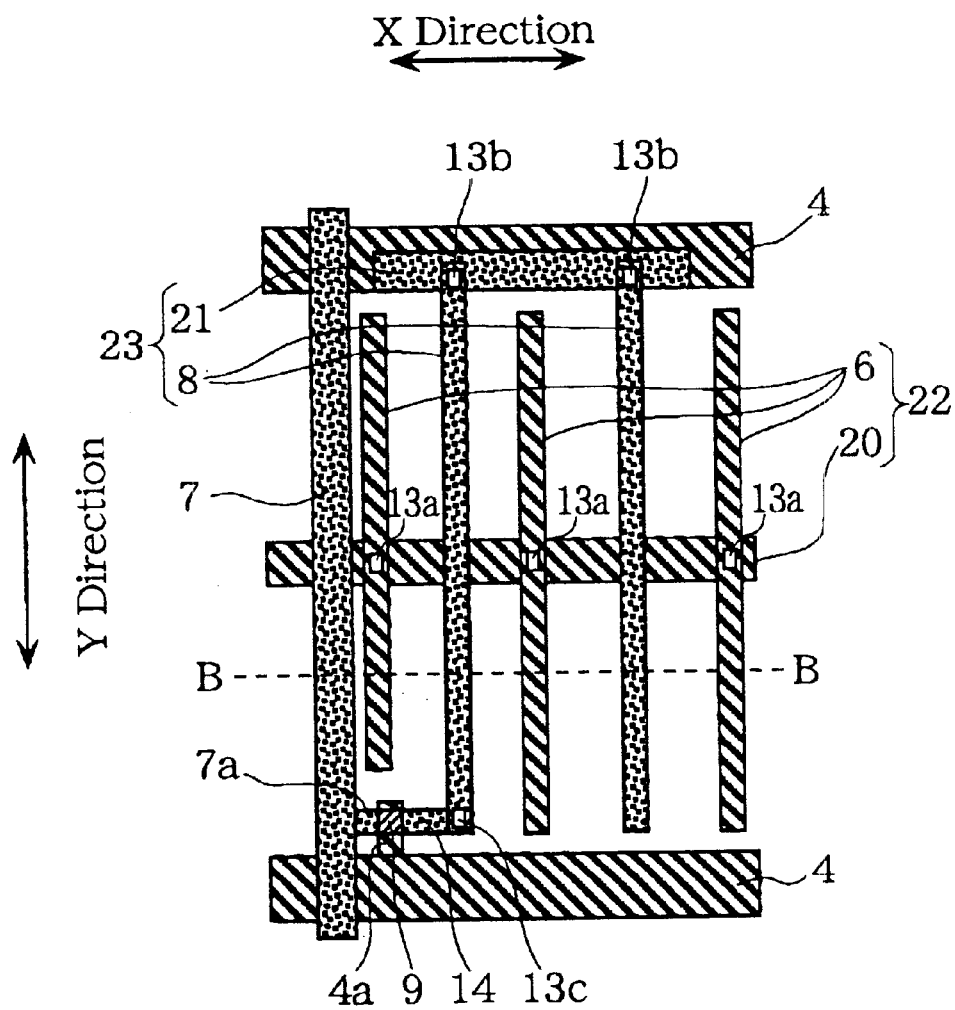
FIG. 5 is a top view schematically showing the structure of the liquid crystal panel in Example 1.
Figure 6:
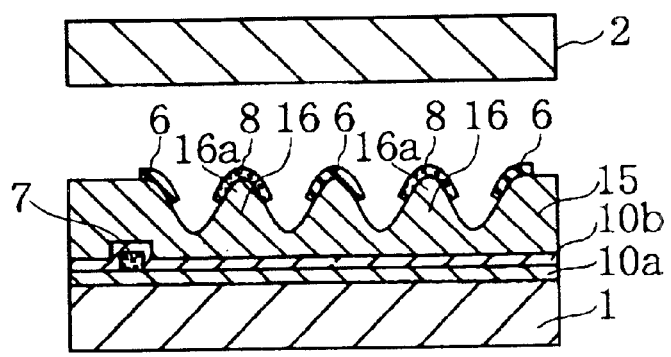
FIG. 6 is a sectional view taken along line B—B of FIG. 5.
Figure 7:
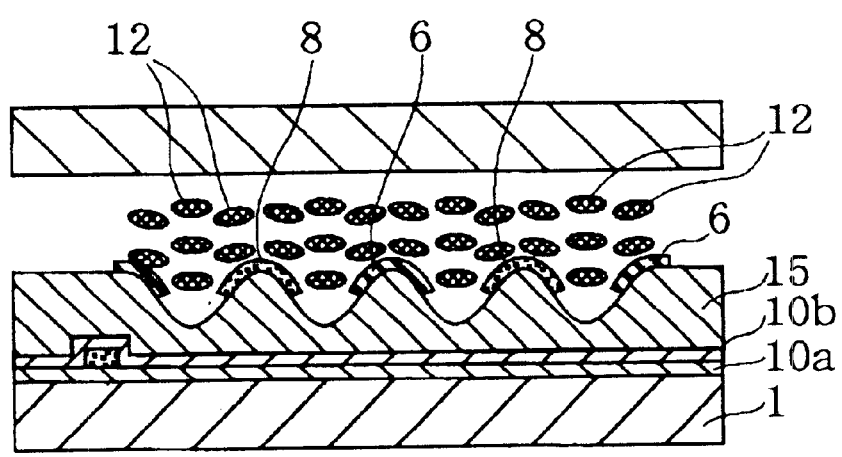
FIG. 7 is a sectional view schematically showing the operating state of the liquid crystal panel in Example 1 of 1st Embodiment.
Figure 8:
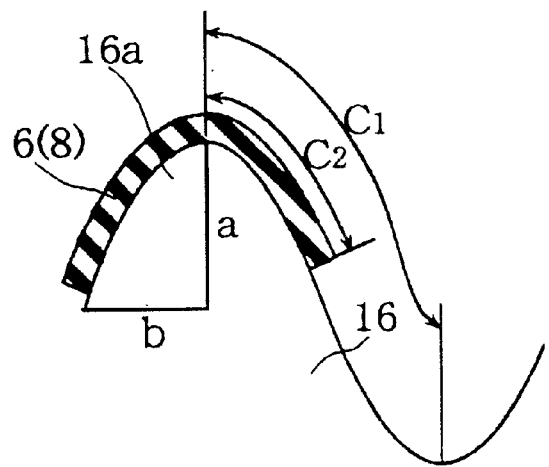
FIG. 8 is an enlarged illustration of a concave-convex part.
Figure 9:
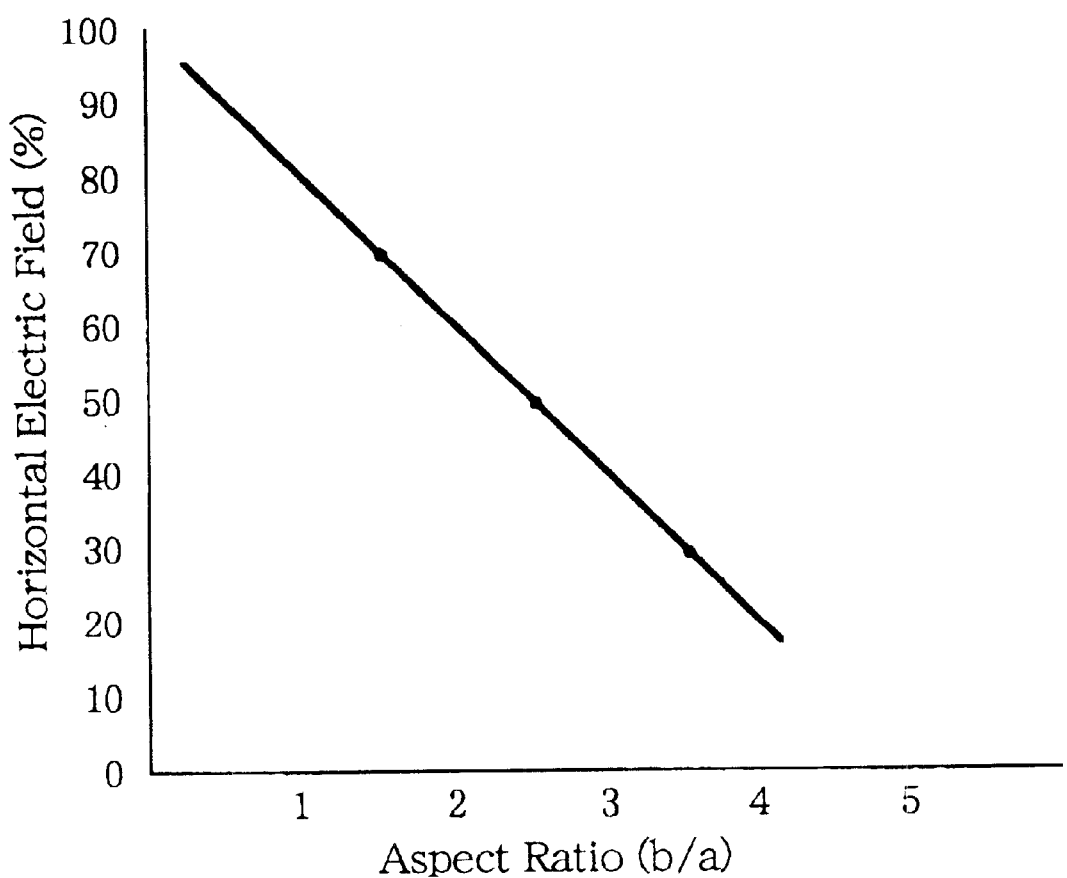
FIG. 9 is a graph showing a relationship between a ratio of horizontal electric field and an aspect ratio.
Figure 10:
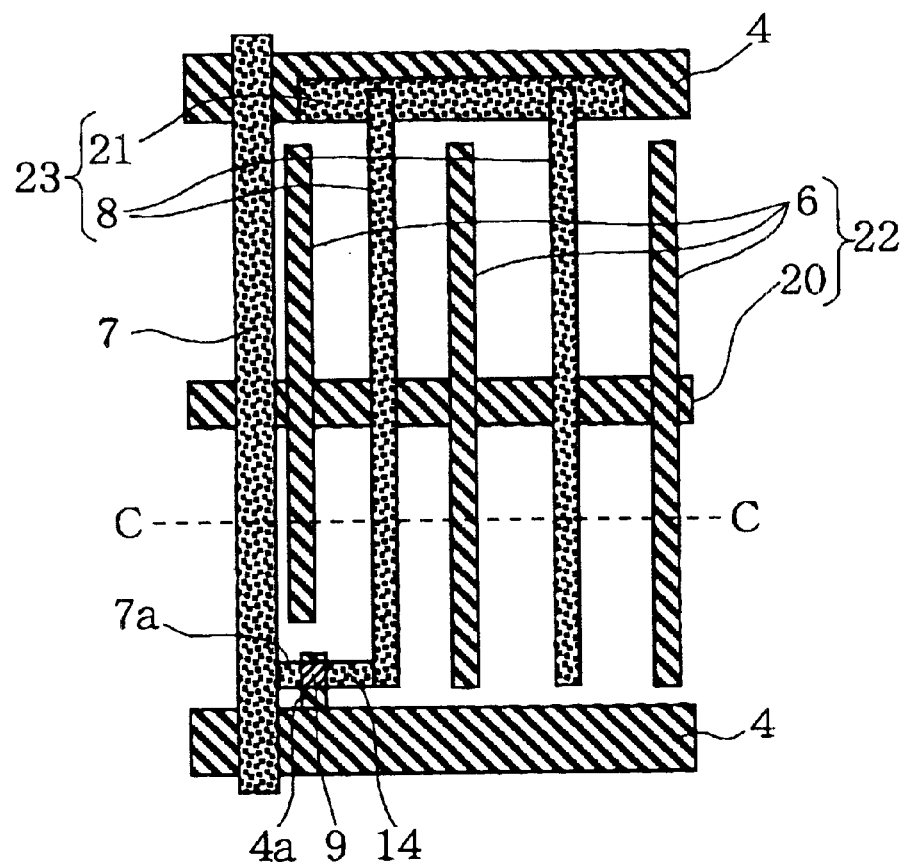
FIG. 10 is a top view schematically showing the structure of the liquid crystal panel according to a variant of Example 1 of 1st Embodiment.
Figure 11:
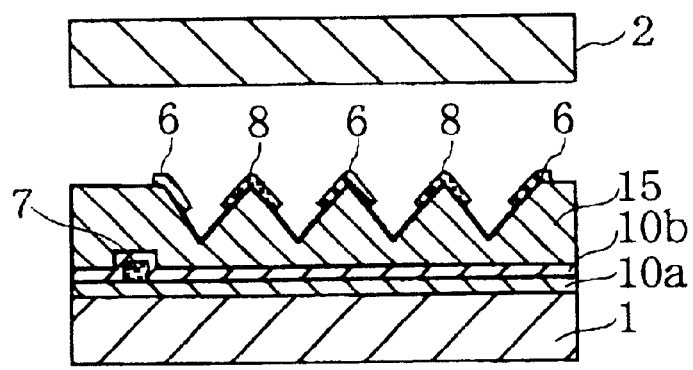
FIG. 11 is a sectional view taken along line C—C of FIG. 10.
Figure 12:
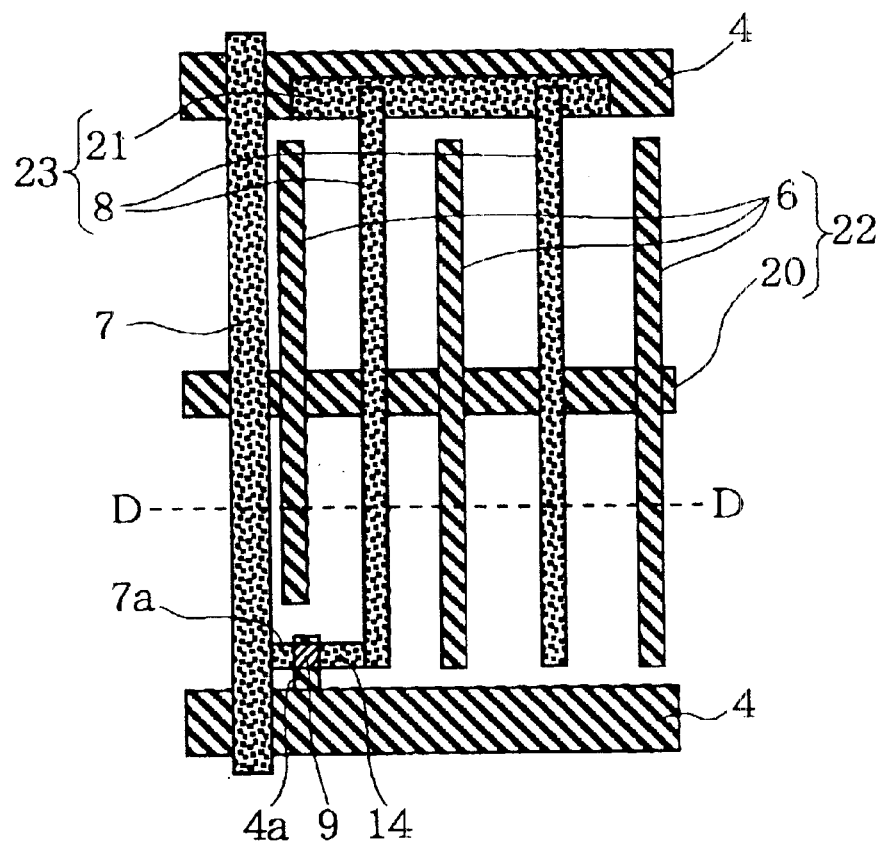
FIG. 12 is a top view schematically showing the structure of the liquid crystal panel according to a further variant of Example 1 of 1st Embodiment.
Figure 13:
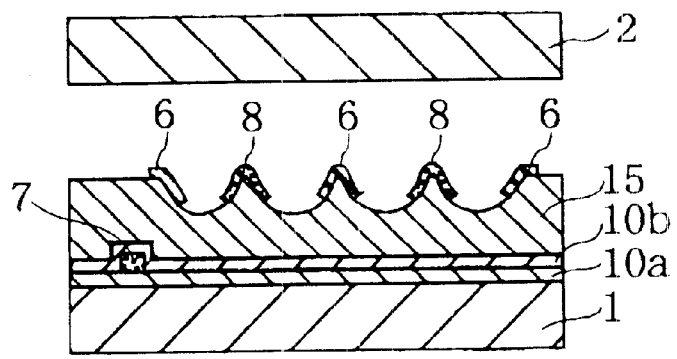
FIG. 13 is a sectional view taken along line D—D of FIG. 12.

Example 1 according to 1st Embodiment of the present invention will be described with reference to FIGS. 5 through 13. FIG. 5 is a top view schematically showing the structure of the liquid crystal panel in Example 1; FIG. 6 is a sectional view taken along line B—B of FIG. 5; FIG. 7 is a sectional view schematically showing the operating state of the liquid crystal panel in Example 1; FIG. 8 is an enlarged illustration of striped projections and depressions;

FIG. 9 is a graph showing a relationship between a ratio of horizontal electric field and an aspect ratio; FIG. 10 is a top view schematically showing the structure of the liquid crystal panel according to a variant of Example 1; FIG. 11 is a sectional view taken along line C—C of FIG. 10; FIG. 12 is a top view schematically showing the structure of the liquid crystal panel according to a further variant of Example 1; and FIG. 13 is a sectional view taken along line D—D of FIG. 12;

As shown in FIGS. 5 and 6, scan signal lines 4 extending in a horizontal direction (hereinafter it is called "the X direction") are arranged on a glass substrate 1 of an array substrate and a wire protecting insulation film 10a is formed on the scan signal lines 4. Video signal lines 7 extending in a vertical direction (hereinafter it is called "the Y direction") are arranged on the insulation film 10a and a wire protecting insulation film 10b is formed on the video signal lines 7. An insulation film 15 is formed on the insulation film 10b, and a wave undulation is formed on the insulation film 15, extending in the Y direction. A glass substrate 2 of an opposing substrate is arranged over the insulation film 15. Liquid crystals (not shown) are sealed in between the glass substrate 2 and the insulation film 15.

A pair of comb pixel electrodes 23 and common electrodes 22 are arranged on the insulation film 15. The pixel electrodes 23 comprise pixel electrode parts 8 . . . arranged linearly in parallel to each other (extending in the Y direction) and leads 21 interconnecting the pixel electrode parts 8 . . . (extending in the X direction). On the other hand, the common electrodes 22 comprise common electrode parts 6 . . . arranged linearly in parallel to each other (extending in the Y direction) and leads 20 interconnecting the common electrode parts 6 . . . (extending in the X direction). The pixel electrode parts 8 . . . and the common electrode parts 6 . . . are alternately formed on striped projection parts 16a of striped projections-and-depressions 16 of the insulation film 15 at the tops and lateral sides thereof. The pixel electrode parts 8 . . . and the leads 21 are connected to each other via contact holes 13b . . . . The common electrode parts 6 . . . and the leads 20 are connected to each other via contact holes 13a . . . .

Further, semiconductor layers (TFT:Thin Film Transistor) 9 as active elements (switching elements) are arranged at intersecting points of the scan signal lines 4 and the video signal lines 7. When the semiconductor layers 9 are put into ON mode under the signals from the scan signal lines 4, a video signal voltage from the video signal lines 7 is applied to the pixel electrodes 23 through sources 7a and drains 14.

With this structure, the horizontal electric field is generated between the pixel electrode parts 8 . . . of the pixel electrodes 23 and the common electrode parts 6 . . . , and as such can allow the liquid crystal molecules to turn in a place of the substrate to do the drive for display of the liquid crystal layer.

The liquid crystal panel thus structured is produced in the process step that the video signal lines 7 and the scan signal lines 4 are formed into a matrix form as a metallic wiring on the glass substrate 1 and then the semiconductor layers 9 are formed at the intersecting points of those lines. Specifically, the liquid crystal panel was produced in the following process steps.

First, after the scan signal lines 4 and the leads 20 of the common electrodes 22 were formed of metal such as Al, an insulation film 10a of e.g. SiNx was formed thereon for protection of these wires and further TFT was formed thereon as the semiconductor layer 9. Then, after the video signal lines 7, the source 7a and the drain 14 were formed of metal of e.g. Al/Ti, an insulation film 10b of e.g. SiNx was formed thereon for protection of these wires. Subsequently, an insulation film 15 having on its surface striped projections-and-depressions 16 was formed on the insulation film 10b by the following process steps, using photosensitive acrylic resin (PC302: available from JSR) which is photo-curing-resin. After the array substrate was coated with PC302 by the spin coat method, it was subjected to pre-bake at 80° C. for 1 minute and in turn to exposure in 300 mJ/cm², while or after being pressed by a mold worked to have a surface of a predetermined form (mirror image of that of the insulation film 15, e.g. a surface of a sine curve). Thereafter, the coated substrate was developed in developing solution (CD702AD) at 25° C. for 1 minute. After having been washed with flowing water, it was subjected to post-bake at 200° C. for 1 hour (it rises beyond room temperature), to thereby form the insulation film 15 having the film thickness of 1.5 $\mu$m.

For good insulating property of the insulation film and substantial flatness of the pixel electrodes and the transparent electrodes, it is preferable that the insulation film has a film thickness of 1 $\mu$m or more. Also, in the case where light is allowed to enter from the glass substrate 1 side, it is preferable to allow diffused light to enter therefrom (by allowing light to enter from a horizontal direction as well or allowing light to enter through a diffusing plate). Further, it is preferable that the mold is produced in such a manner that light can pass through it to allow light to enter from the mold side.

After the insulation film 15 was produced in the above-mentioned process, the contact holes 13a, 13b and 13c were formed in the insulation film 15. Thereafter, the pixel electrode parts 8 . . . of the pixel electrodes 23 connected with the drain 14 were formed by transparent conductive film (ITO: indium oxide-tin oxide). This brings the drains 14 and the pixel electrode parts 8 . . . of the pixel electrodes 23 into contact with each other through the contact holes 13c and brings the leads 21 of the pixel electrodes 23 and the pixel electrode parts 8 . . . of the pixel electrodes 23 into contact with each other through the contact holes 13b . . . .

Next, the common electrode parts 6 . . . were formed by transparent conductive film of ITO. This process brings the leads 20 of the common electrodes 22 and the common electrode parts 6 . . . into contact with each other through the contact holes 13a . . . .

It may be conceivable that the scan signal lines 4 and the video signal lines 7 are formed of ITO, but, in view of the fact that when the signal lines 4, 7 are formed of ITO, the wiring resistance increases too much (the value of resistance of ITO is 100–500 $\mu\Omega$cm, while that of Al is 4 $\mu\Omega$cm), it is desirable that the signal lines 4, 7 are formed of metal of small wiring resistance, such as Al. For protection of the pixel electrode parts 8 . . . of the pixel electrodes 23 or the common electrode parts 6 . . . of the common electrodes 22, an insulation film of SiNx may be formed on those parts after the pixel electrode parts 8 . . . and the common electrode parts 6 . . . are formed (not shown in the Example).

Subsequently, alignment layers (AL5417: available from JSR) were printed on the glass substrate 1 and the glass substrate 1 and the glass substrate 2 and then were subjected to the rubbing. Thereafter, sealing resin (STRUCT BOND: available from MITSUI TOATSU CHEMICALS, INC.) was printed on a marginal portion of the glass substrate 1. Spacers composed of glass fibers of 4.0 $\mu$m (available from NIPPON ELECTRIC GLASS CO., LTD.) were mixed in the sealing resin.

Thereafter, resin balls having the diameter of 3.5 μm (Epostar-GP-HC: available from NIPPON SHOKUBAI CO., LTD.) were sprayed as the spacers in the display region in order to keep the distance between the substrate. Thereafter, the glass substrate 1 and the glass substrate 2 were bonded together, and the sealing resin was cured by heating at 150° C. for 2 hours.

Subsequently, liquid crystal (MT5087: available from Chisso Corporation) is injected into the empty panel thus produced by the vacuum injection method (in which the empty panel is placed to be evacuated in a tank of reduced pressure; the injection port is put into contact with the liquid crystal; and the pressure in the tank is returned to the ordinary pressure, so as to inject the liquid crystals into the panel).

Finally, photo-curing resin (LOCTITE352A: available from LOCTITE JAPAN CORPORATION) used as sealing resin was applied to the entirety of the injection port of the liquid crystal panel and then irradiated with light in 10 mW/cm² for 5 minutes to cure the sealing resin. Thereafter, polarizing plates (NPF-HEG1425DU: available from NITTO DENKO CORPORATION) are stuck on top and bottom sides of the glass substrates 1 and 2 (on the outside surfaces of the glass substrates). Thus, the liquid crystal panel was produced.

Figure 1:
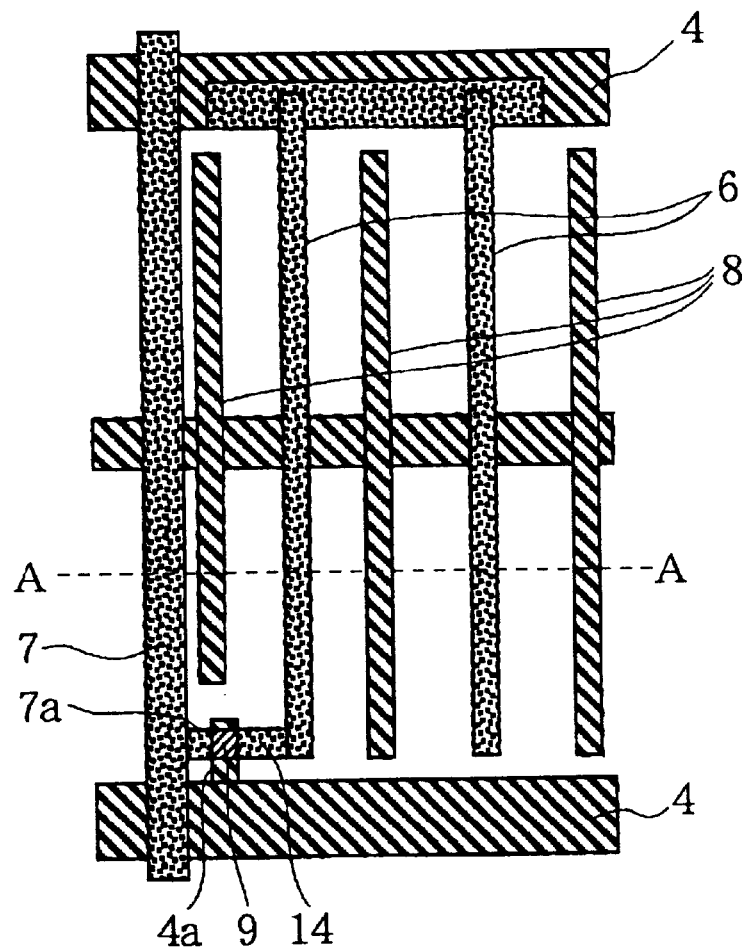
FIG. 1 is a top view schematically showing the structure of a conventional liquid crystal panel.
Figure 2:
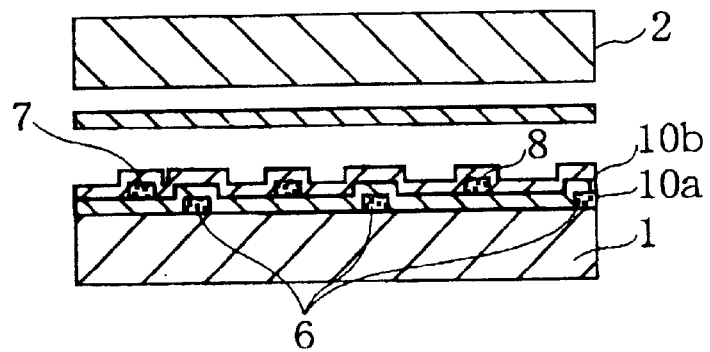
FIG. 2 is a sectional view taken along line A—A of FIG. 1.

For the sake of comparison, a liquid crystal panel of Comparative Example was produced in which the pixel electrode parts 8 . . . and the common electrode parts 6 . . . of the common electrodes 22 were formed into a rectangle shape, as in the prior art, as shown in FIGS. 1 and 2. Comparison was made between the performances of the liquid crystal panel of the present invention and those of the liquid crystal panel of Comparative Example. The results are given below.

Figure 3:
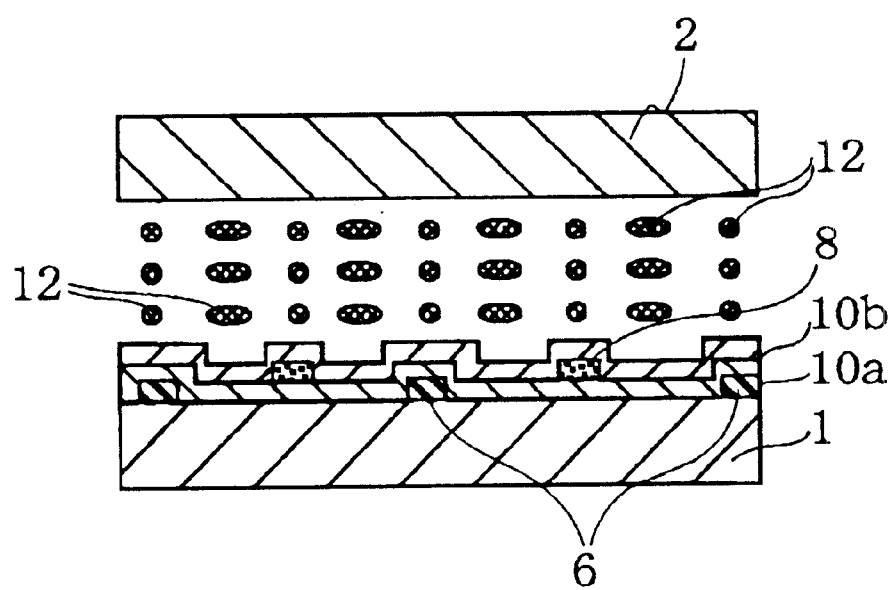
FIG. 3 is a sectional view schematically showing the operating state of the conventional liquid crystal panel.

First, when he both liquid crystal panels were observed under a microscope with a voltage applied thereto, the following was found. In the liquid crystal panel of Comparative Example, since the horizontal electric field being not fully applied to the liquid crystal molecules 12 over the electrodes, no operation of the liquid crystal molecules 12 was found in the related parts, as shown in FIG. 3. Thus, the liquid crystal panel of Comparative Example was found to have insufficient brightness. In contrast to this, in the liquid crystal panel of the present invention, since the horizontal electric field is fully applied also to the liquid crystal molecules 12 over the electrodes, operation of the liquid crystal molecules 12 was found in the related parts as well, as shown in FIG. 7. Thus, the liquid crystal panel was found to have sufficient brightness.

The insulation film 15 forming thereon the striped projections-and-depressions 16, when formed as in the present invention, enables the aperture ratio to increase and also enables the opposing area of the pixel electrode parts 8 . . . of the pixel electrodes 23 and the common electrode parts 6 . . . of the common electrodes 22 to increase. This can provide the result that the horizontal electric filed is easily applied to the liquid crystal molecules and thus the liquid crystal molecules can easily shift in position.

In addition, in the liquid crystal panel of the present invention, since the pixel electrode parts 8 . . . and the common electrode parts 6 . . . are formed on the striped projection parts 16a of the striped projections-and-depressions 16, upward orienting parts of the pixel electrode parts 8 . . . and common electrode parts 6 . . . become narrower (in other words, only the apexes of the striped projection parts 16a orient upwardly). This contributes to reduction of the application of the vertical electric field and results in increase of the application of the horizontal electric field to a sufficient extent.

Further, it is well known that the speed of response is proportional to the square of a distance between the pixel electrode parts 8 . . . and the common electrode parts 6 . . . and it is needless to say that the distance therebetween should be shortened. In the present liquid crystal panel, the distance between the electrodes is the order of 12 μm and the speed of response is as slow as the order of 60 msec. In view of this, it may be conceivable that the distance between the pixel electrode parts 8 . . . and the common electrode parts 6 . . . is narrowed to produce increased speed of response. However, since the conventional pixel electrode parts 8 . . . and common electrode parts 6 . . . are not formed by the transparent electrodes, the narrowing of the distance therebetween results in increase in the number of electrodes to that extent and decrease in the aperture ratio.

In contrast to this, with the construction of the present invention. having the pixel electrode parts 8 . . . and common electrode parts 6 . . . formed by the transparent electrodes, even when the distance between the pixel electrode parts 8 . . . and the common electrode parts 6 . . . is narrowed to provide increased number of electrodes, the decrease in the aperture ratio can be prevented. Thus, while the decrease of the aperture ratio is prevented, the speed of response can be increased by narrowing the distance between the electrodes. It was confirmed that with the distance between the electrodes reduced to be 6 μm, the drive was effected at the speed of response of 15 msec or less enough for adequate display of a moving image.

Next, an optimum value of the aspect ratio (b/a in the diagram) in the striped projection part 16a was examined, as shown in FIG. 8. The results are given in FIG. 9.

FIG. 9 shows that when the aspect ratio (b/a in the diagram) in the striped projection part 16a is 2.5 or less, application of the horizontal (X) electric field is 50% or more, or particularly when the aspect ratio (b/a) is 1.5 or less, the application of the horizontal (X) electric field is 70% or more. Accordingly, the aspect ratio (b/a) in the striped projection part 16a is preferably not more than 2.5, or particularly preferably not more than 1.5.

Further, as shown in FIG. 8, an optimum value on the ratio (C2/C1) of a length (C2) of the pixel electrode part 8 or common electrode part 6 to a length (C1) of an oblique plane was examined. As a result of this, it was found that when the ratio (C2/C1) exceeded 0.5, the state of the horizontal electric filed was disordered, though not shown. Accordingly, the ratio (C2/C1) is preferably not more than 0.5.

While the wavy-formed striped projection-and-depressions 16 of the insulation film 15 is used in the above-mentioned first aspect of the invention, the present invention is not limited to the use of such wavy formed ones. The striped projection-and-depressions may of course be formed into, for example, a V-shape as shown in FIGS. 10 and 11, an inverted semicircle shape as shown in FIGS. 12 and 13, or an inverted semi-ellipse shape (not shown).

Also, the method of forming the striped projection-and-depressions 16 is not limited to the method as illustrated in the above-mentioned aspect of the invention. The striped projections-and-depressions 16 may be formed by the photo-etching method, for example.

EXAMPLE 2

Figure 14:
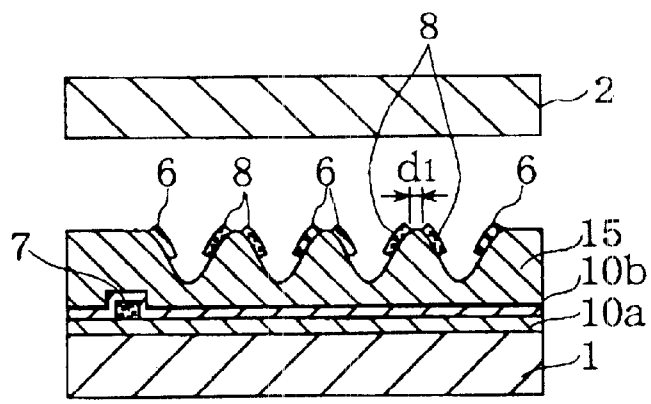
FIG. 14 is a sectional view showing the structure of the liquid crystal panel in Example 2 of 1st Embodiment.
Figure 15:
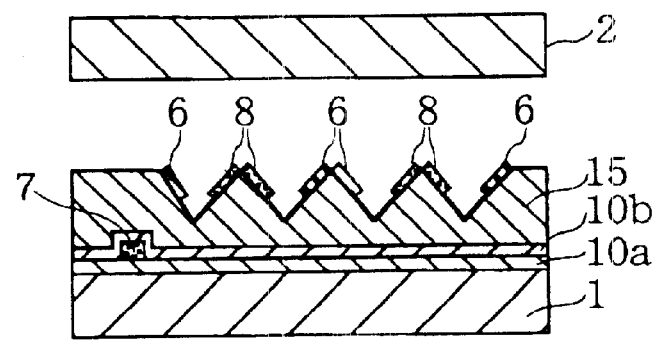
FIG. 15 is a sectional view showing the structure of the liquid crystal panel according to a variant in Example 2 of 1st Embodiment.
Figure 16:
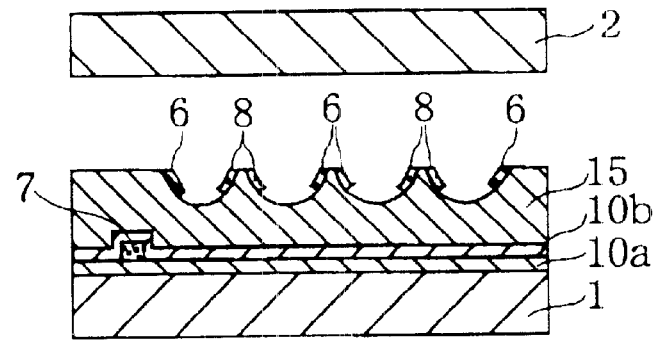
FIG. 16 is a sectional view showing the structure of the liquid crystal panel according to a further variant in Example 2 of 1st Embodiment.

Example 2 according to 1st Embodiment of the present invention will be described with reference to FIGS. 14 though 16. FIG. 14 is a sectional view showing the structure of the liquid crystal panel in Example 2; FIG. 15 is a sectional view showing the structure of the liquid crystal panel according to a variant in Example 2; and FIG. 16 is a sectional view showing the structure of the liquid crystal panel according to a further variant in Example 2.

As shown in FIG. 14, the liquid crystal panel shown in FIG. 2 is identical in construction to Example 1, except the construction that the pixel electrode parts 8 . . . of the pixel electrodes 23 and the common electrode parts 6 . . . are formed only on the side faces of the striped projection parts 16a of the insulation film 15 (in other words, not formed on the tops thereof).

This construction in which the pixel electrode parts 8 . . . and the common electrode parts 6 . . . are not formed on the tops enables the application of the vertical electric field to be reduced further, as compared with Example 1, and thus produces further increased application of the horizontal electric field.

However, an excessively long distance between the electrodes at the apex (d1 in FIG. 14) does not effect the adequate application of the horizontal electric field, so it is preferably that the distance d1 between the electrodes is limited to 6 μm or less.

In Example 2 also, the striped projection-and-depressions 16 of the insulation film 15 is not limited to the wavy formed ones. They may of course be formed into, for example, a V-shape as shown in FIG. 15, an inverted semicircle shape as shown in FIG. 16, or an inverted semi-ellipse shape (not shown).

EXAMPLE 3

Figure 17:
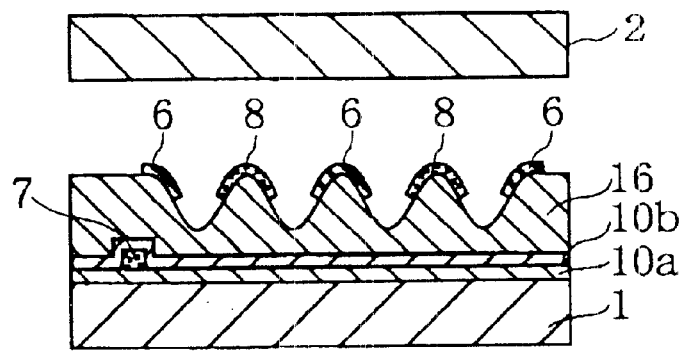
FIG. 17 is a sectional view showing the structure of the liquid crystal panel in Example 3 of 1st Embodiment.
Figure 18:
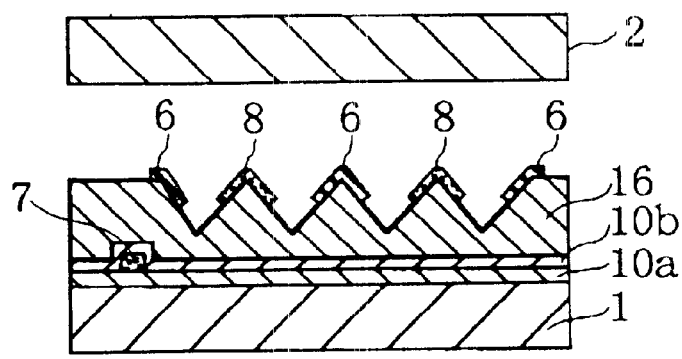
FIG. 18 is a sectional view showing the structure of the liquid crystal panel according to a variant in Example 3 of 1st Embodiment.
Figure 19:
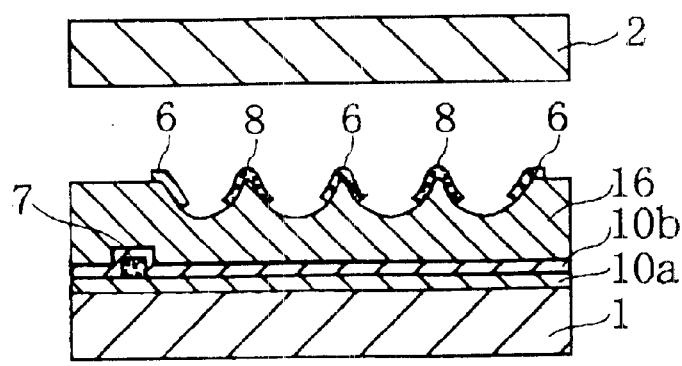
FIG. 19 is a sectional view showing the structure of the liquid crystal panel according to a further variant in Example 3 of 1st Embodiment.

Example 3 according to 1st Embodiment of the present invention will be described with reference to FIGS. 17 through 19. FIG. 17 is a sectional view showing the structure of the liquid crystal panel in Example 3; FIG. 18 is a sectional view showing the structure of the liquid crystal panel according to a variant in Example 3; and FIG. 19 is a sectional view showing the structure of the liquid crystal panel according to a further variant in Example 3.

As shown in FIG. 17, the liquid crystal panel shown in the same Figure is identical in construction to Example 1, except the construction that color filter layer 17 is used as the insulation film forming thereon the striped projections-and-depressions 16.

The color filter layer 17 was formed in the following manner.

First, the substrate was coated with color resist in which colorant is dispersed in acrylic photosensitive resin by the ink jet process and then was subjected to pre-bake at 80° C. for 1 minute. The coating of the color resist was performed in such a manner that three primary colors of R, G, B are applied to their related pixels at the corresponding positions. Then, the coated substrate was subjected to exposure in 500 mJ/cm$^2$ from the glass substrate 1 side, while or after being pressed by the mold worked to have a surface of a predetermined form. Thereafter, the coated substrate was developed in developing solution at 25° C. for 2 minutes. After having been washed with flowing water, it was subjected to post-bake at 200° C. for 1 hour to thereby form the color filter layer 17 having the film thickness of 1.0 μm.

This construction can yield improvement in aperture ratio and speed of response and increase in brightness of the liquid crystal panel, as is the case with Example 1. In addition to this, this can eliminate the need to form the color filter on the glass substrate 2 and thus can eliminate the need for any margin for sticking the color filter thereon, thus producing further increased aperture ratio. Further, since the insulation film and the color filter layer 17 can commonly be used (the color filter layer 17 is doubled as the insulation film), simplified production process and reduced number of members can be yielded.

While the colors (R, G, B) were simultaneously formed by the ink jet process in Example 3, the colors may be formed color by color by the spin coat method, the printing method, or the like.

Also, while the color layer was formed by using the photosensitive color resist in Example 3, it may be formed by an alternative process that after non-photo-sensitive polymer material in which colorant is dispersed is formed on the substrate, a photosensitive resist layer is additionally formed and subjected to exposure and development. In addition to these, the color layer may be formed by another alternative process such as the staining method.

In addition, in the case where light is allowed to enter from the glass substrate 1 side, it is preferable to allow diffused light to enter therefrom and also it is preferable that the mold is produced in such a manner that light can pass through it to allow light to enter from the mold side, as in the case with Examples 1 and 2.

Further, in Example 3 also, the striped projections-and-depressions of the color filter layer 17 is not limited to the wavy formed ones. They may of course be formed into, for example, a V-shape as shown in FIG. 18, an inverted semicircle shape as shown in FIG. 19, or an inverted semi-ellipse shape (not shown).

EXAMPLE 4

Figure 20:
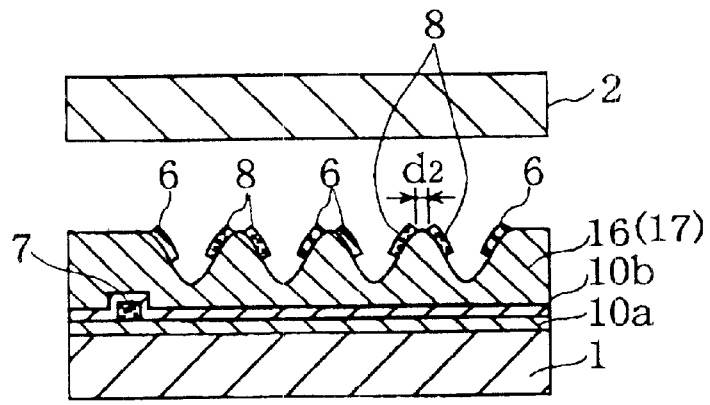
FIG. 20 is a sectional view showing the structure of the liquid crystal panel in Example 4 of 1st Embodiment.
Figure 21:
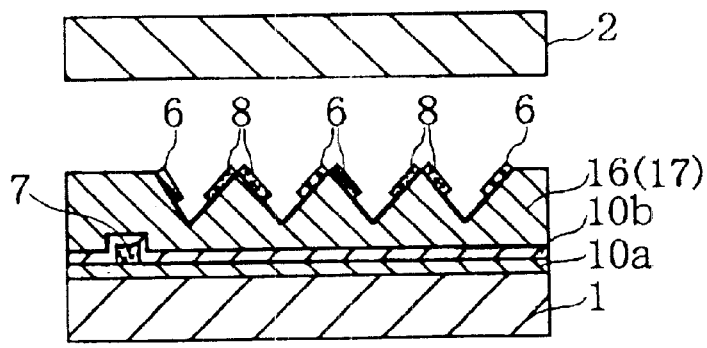
FIG. 21 is a sectional view showing the structure of the liquid crystal panel according to a variant in Example 4 of 1st Embodiment.
Figure 22:
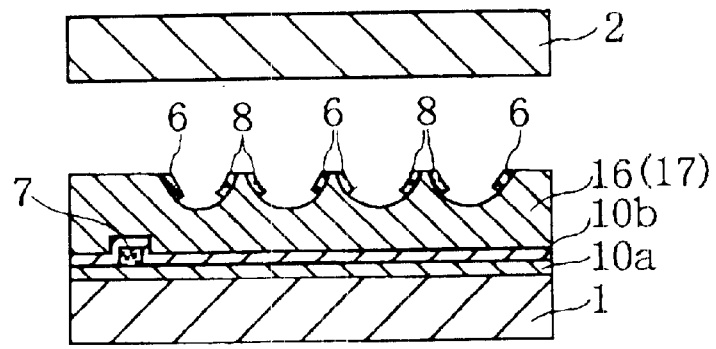
FIG. 22 is a sectional view showing the structure of the liquid crystal panel according to a further variant in Example 4 of 1st Embodiment.

Example 4 according to 1st Embodiment of the present invention will be described with reference to FIGS. 20 through 22. FIG. 20 is a sectional view showing the structure of the liquid crystal panel in Example 4; FIG. 21 is a sectional view showing the structure of the liquid crystal panel according to a variant in Example 4; and FIG. 22 is a sectional view showing the structure of the liquid crystal panel according to a further variant in Example 4.

As shown in FIG. 20, the liquid crystal panel shown in Example 4 is identical in construction to Example 3, except the construction that the pixel electrode parts 8 . . . of the pixel electrodes 23 and the common electrode parts 6 . . . are formed only on the side faces of the striped projection parts of the color filter layer 17 (in other words, not formed on the tops thereof).

This construction in which the pixel electrode parts 8 . . . and the common electrode parts 6 . . . are not formed on the tops enable the application of the vertical electric field to be reduced further, as compared with Example 3, and thus produces further increased application of the horizontal electric field.

However, an excessively long distance between the electrodes at the apex (d2 in FIG. 20) does not effect the adequate application of the horizontal electric field, so it is preferable that the distance between the electrodes is limited to 4 μm or less.

In Example 4 also, the striped projections-and-depressions of the color filter layer 17 is not limited to the wavy formed ones. They may of course be formed into, for example, a V-shape as shown in FIG. 21, an inverted semicircle shape as shown in FIG. 22, or an inverted semi-ellipse shape (not shown).

OTHER RESPECTS ON STRUCTURE OF EXAMPLES 1 TO 4 OF 1ST EMBODIMENT (1) While MT5087 (available from Chisso Corporation) of positive dielectric constant anisotropy was used as the liquid crystal in the above-mentioned Examples, this is not of restrictive. The other commercially available liquid crystal, such as E-7 (available from British Drug House Ltd.), E-8 (available from British Drug House Ltd.), ZLI4792 (available from Merck Japan Limited), and TL202 (available from Merck Japan Limited), may also be used. ZLI4788 (available from Merck Japan Limited) of negative constant anisotropy or the like may be used. Also, the type of liquid crystal is not limited to Nematic. The other types, such as ferroelectricity liquid crystal and antiferroelectricity liquid crystal, may be used. This means that the present invention is effective irrespective of type of liquid crystal material and alignment layer material.

(2) While the TFT of a three terminal element was used as the active element in the above-mentioned Examples, MIM (Metal-Insulator-Metal) of a two terminal element, a ZnO varistor, a SiNx diode, a a-Si diode and the like may be used. Also, the transistor structure is not limited to the a-Si of a bottom-gate structure. The other transistor structure, such as a-Si of a top-gate structure and a p-Si, may be used. In addition, a drive circuit may be formed on the periphery of the substrate.

(3) While the two substrates were both formed by the glass substrates in the above-mentioned Examples, either or both of the substrates may be formed on film, plastics and the other material. Also, a glass substrate with ITO, a substrate with a color filter and the like may be used as the glass substrate 2 (the opposing substrate). A further alternative substrate forming a color filter on the glass substrate 1 side (the array substrate side) or on the glass substrate 2 side (the opposing substrate side) may be used.

(4) An alignment layer able to produce an increased pre-tilt angle or a vertical alignment layer may be used as the alignment layer. When the alignment process using no rubbing process (e.g. the alignment process using light) is used, a further uniform alignment can be produced and thus an improved contrast can be provided. Further, the other method (e.g. the method in which prisms are formed of resin) than the spacer spraying method may be used to produce a uniform cell-gap.

(5) The striped projections-and-depressions may be formed on e.g. the substrate (glass), instead of being formed on the insulation film.

While no electrodes are formed on the opposing substrate side (the glass substrate 2 side) in the Examples illustrated above, the electrodes may be formed on the opposing substrate side or alternatively conductive material may be formed thereon, instead of the electrodes.

SECOND EMBODIMENT

EXAMPLE 1

Figure 23:
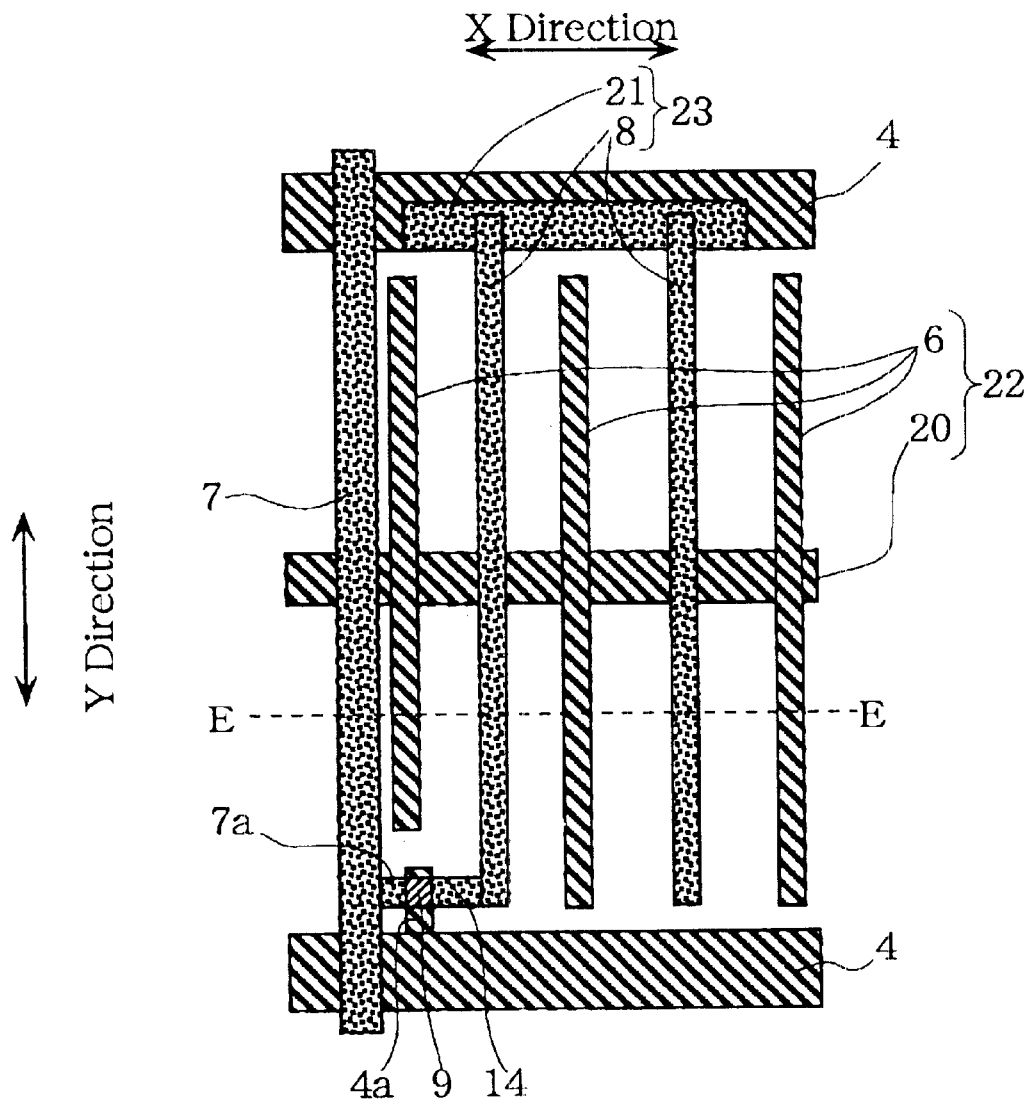
FIG. 23 is a top view schematically showing the structure of the liquid crystal panel in Example 1 of 2nd Embodiment.
Figure 24:
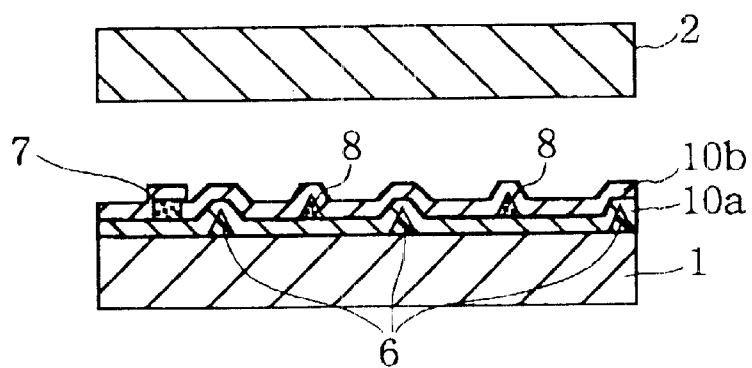
FIG. 24 is a sectional view taken along line E—E of FIG. 23.
Figure 25:
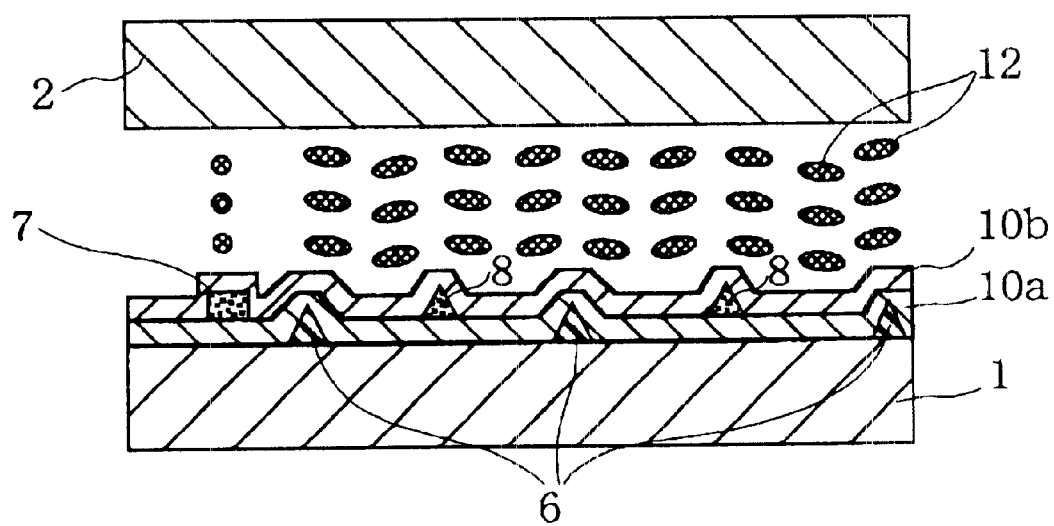
FIG. 25 is a sectional view schematically showing the operating state of the liquid crystal panel in Example 1 of 2nd Embodiment.

Example 1 according to 2 nd Embodiment of the present invention will be described with reference to FIGS. 23 through 25. FIG. 23 is a top view schematically showing the structure of the liquid crystal panel in Example 1 of 2 nd Embodiment; FIG. 24 is a sectional view taken along line E—E of FIG. 23; and FIG. 25 is a sectional view schematically showing the operating state of the liquid crystal panel in Example 1 of 2 nd Embodiment.

As shown in FIGS. 23 and 24, the scan signal lines 4 extending in a horizontal direction (hereinafter it is called "the X direction") and the comb common electrode 22 are arranged on the glass substrate 1 of the array substrate. The comb common electrode 22 comprises the common electrode parts 6 . . . extending linearly in parallel to each other (extending in the Y direction) and the leads 20 (extending in the X direction) interconnecting the common electrode parts 6 . . . . The wire protecting insulation film 10a is formed on the scan signal lines 4 and the common electrode 22. The video signal lines 7 extending in a vertical direction (hereinafter it is called "the Y direction") and the comb pixel electrode 23 are arranged on the insulation film 10a. The comb pixel electrode 23 comprises the pixel electrode part 8 . . . extending linearly in parallel to each other (extending in the Y direction) and the leads 21 (extending in the X direction) interconnecting the pixel electrode parts 8 . . . . The wire protecting insulation film 10b is formed on the video signal lines 7 and the pixel electrode 23. The glass substrate 2 of the opposing substrate is arranged over the insulation film 10b. Liquid crystals (not shown) are sealed in between the glass substrate 2 and the insulation film 10b.

The pixel electrode parts 8 . . . and the common electrode parts 6 . . . are formed into a tapered shape (a triangular shape in Example 1) in section with respect to the horizontal electric filed direction and are alternately formed. The pixel electrodes 8 . . . and the leads 21 are connected to each other, and the common electrodes 6 . . . and the leads 20 are connected to each other.

Further, the semiconductor layers (TFT: Thin Film Transistor) 9 as the active elements (switching elements) are arranged at intersecting points of the scan signal lines 4 and the video signal lines 7. When the semiconductor layers 9 are put into ON mode with application of the signals from the scan signal lines 4 to the gates 4a, a video signal voltage from the video signal lines 7 is applied to the pixel electrodes 23 through the sources 7a and the drains 14.

With this structure, the horizontal electric field is generated between the pixel electrode parts 8 . . . of the pixel electrodes 23 and the common electrode parts 6 . . . , and as such can allow the liquid crystal molecules to turn in a place of the substrate to do the drive for display of the liquid crystal layer.

The liquid crystal panel thus structured is produced in the process step that the video signal lines 7 and the scan signal lines 4 are formed into a matrix form as a metallic wiring on the glass substrate 1 and then the semiconductor layers 9 are formed at the intersecting points of those lines. Specifically, the liquid crystal panel was produced in the following process steps.

First, the scan signal lines 4 and the leads 20 of the common electrodes 22 which were formed of metal such as Al were formed on the glass substrate 1. Thereafter, the common electrode parts 6 . . . formed of the transparent conductive film (ITO: indium oxide-tin oxide) were extended linearly in the Y direction to be in parallel to each other and were connected with the leads 20. Thereafter, the common electrode parts 6 . . . are formed to have a triangular section by taper etching. Then, the insulation film 10a of $SiO_2$ and the like was formed for protection of these wires and further the TFT was formed as the semiconductor layer 9 on the insulation film.

Next, after the video signal line 7, the source 7a and the drain 14 were formed of metal comprising Al/Ti, the leads 21 were formed in the X direction. The pixel electrode parts 8 . . . formed by the transparent conductive film (ITO: indium oxide-tin oxide) were extended linearly in the Y direction to be in parallel to each other and were connected with the drain 14. The pixel electrode parts 8 . . . were formed to have a triangular section by taper etching. Then, the insulation film 10b of SiNx and the like was formed for protection of these wires.

It may be conceivable that the scan signal lines 4 and the video signal lines 7 are formed of ITO, but, in view of the fact that when the signal lines 4, 7 are formed of ITO, the wiring resistance increases too much (the value of resistance of ITO is 100–500 $\mu\Omega$cm, while that of Al is 4 $\mu\Omega$cm), it is desirable that the signal lines 4, 7 are formed of metal of small wiring resistance, such as Al.

Subsequently, alignment layers (AL5417: available from JSR) were printed on the glass substrate 1 and the glass substrate 2 and then were subjected to the rubbing. Thereafter, sealing resin (STRUCT BOND: available from MITSUI TOATSU CHEMICALS, INC.) was printed on a marginal portion of the glass substrate 1. Spacers composed of glass fibers of 4.0 $\mu$m (available from NIPPON ELECTRIC GLASS CO., LTD.) were mixed in the sealing resin.

Thereafter, resin balls having the diameter of 3.5 $\mu$m (Epostar-GP-HC: available from NIPPON SHOKUBAI CO., LTD.) were sprayed as the spacers in the display region in order to keep the distance between the substrates. Thereafter, the glass substrate 1 and the glass substrate 2 were bonded together, and the sealing resin was cured by heating at 150° C. for 2 hours.

Subsequently, liquid crystal (MT5087: available from Chisso Corporation) is injected into the empty panel thus produced by the vacuum injection method (in which the empty panel is placed to be evacuated in a tank of reduced pressure; the injection port is put into contact with the liquid crystals; and the pressure in the tank is returned to the ordinary pressure, so as to inject the liquid crystals into the panel).

Finally, photo-curing resin (LOCTITE352A: available from LOCTITE JAPAN CORPORATION) used as sealing resin was applied to the entirety of the injection port of the liquid crystal panel and then irradiated with light in 10 mW/cm$^2$ for 5 minutes to cure the sealing resin. Thereafter, polarizing plates (NPF-HEG1425DU: available from NITTO DENKO CORPORATION) are stuck on top and bottom sides of the glass substrates 1 and 2 (on the outside surfaces of the glass substrates). Thus, the liquid crystal panel was produced.

For the sake of comparison, a liquid crystal panel of Comparative Example was produced in which the pixel electrode parts 8 . . . of the pixel electrodes 23 and the common electrode parts 6 . . . of the common electrodes 22 were formed into a rectangle shape, as in the prior art, as shown in FIGS. 1 and 2. Comparison was made between the performances of the liquid crystal panel of the present invention and those of the liquid crystal panel of Comparative Example. The results are given below.

First, when the both liquid crystal panels were observed under a microscope with a voltage applied thereto, the following was found. In the liquid crystal panel of Comparative Example, since the horizontal electric field is not fully applied to the liquid crystal molecules 12 over the electrodes, no operation of the liquid crystal molecules 12 was found in the related parts, as shown in FIG. 3. Thus, the liquid crystal panel of Comparative Example was found to have insufficient brightness. In contrast to this, in the liquid crystal panel of the present invention, since the pixel electrode parts 8 . . . and the common electrode parts 6 . . . formed to have a triangular section can allow the horizontal electric field to be fully applied also to the liquid crystal molecules 12 over the electrodes, operation of the liquid crystal molecules 12 was found in the related parts as well, as shown in FIG. 25. Thus, the liquid crystal panel was found to have sufficient brightness. Also, the pixel electrode parts 8 . . . and the common electrode parts 6 . . . , when formed by the transparent electrodes as in the present invention, can produce an increased aperture ratio.

In addition, in the liquid crystal panel of the present invention, since the pixel electrode parts 8 . . . and the common electrode parts 6 . . . are formed to have the triangular section, upward orienting parts of the pixel electrode parts 8 . . . and common electrode parts 6 . . . become narrower (in other words, only the apexes of the triangle shaped parts orient upwardly). This contributes to reduction of the application of the vertical electric field and results in increase of the application of the horizontal electric field to a sufficient extent.

Further, it is well known that the speed of response is proportional to the square of a distance between the pixel electrode parts 8 . . . and the common electrode parts 6 . . . and it is needless to say that the distance therebetween should be shortened. In the present liquid crystal panel, the distance between the electrodes is the order of 12 $\mu$m and the speed of response is as slow as the order of 60 msec. In view of this, it may be conceivable that the distance between the pixel electrode parts 8 . . . and the common electrode parts 6 . . . is narrowed to produce increased speed of response. However, since the conventional pixel electrode parts 8 . . . and common electrode parts 6 . . . are not formed by the transparent electrodes, the narrowing of the distance therebetween results in increase in the number of electrodes to that extent and decrease in the aperture ratio.

In contrast to this, with the construction of the present invention having the pixel electrode parts 8 . . . and common electrode parts 6 . . . formed by the transparent electrodes, even when the distance between the pixel electrode parts 8 . . . and the common electrode parts 6 . . . is narrowed to provide increased number of electrodes, the decrease in the aperture ratio can be prevented. Thus, while the decrease of the aperture ratio is prevented, the speed of response can be increased by narrowing the distance between the electrodes. It was confirmed that with the distance between the electrodes reduced to be 6 $\mu$m, the drive was effected at the speed of response of 15 msec or less enough for adequate display of a moving image.

While the electrodes are formed to have the triangular section in Example 1, the electrodes may alternatively be formed to have a polygonal shape in section of at least pentagon, without limiting to triangle, as long as they are formed to have a tapered shape in section.

EXAMPLE 2

Figure 26:
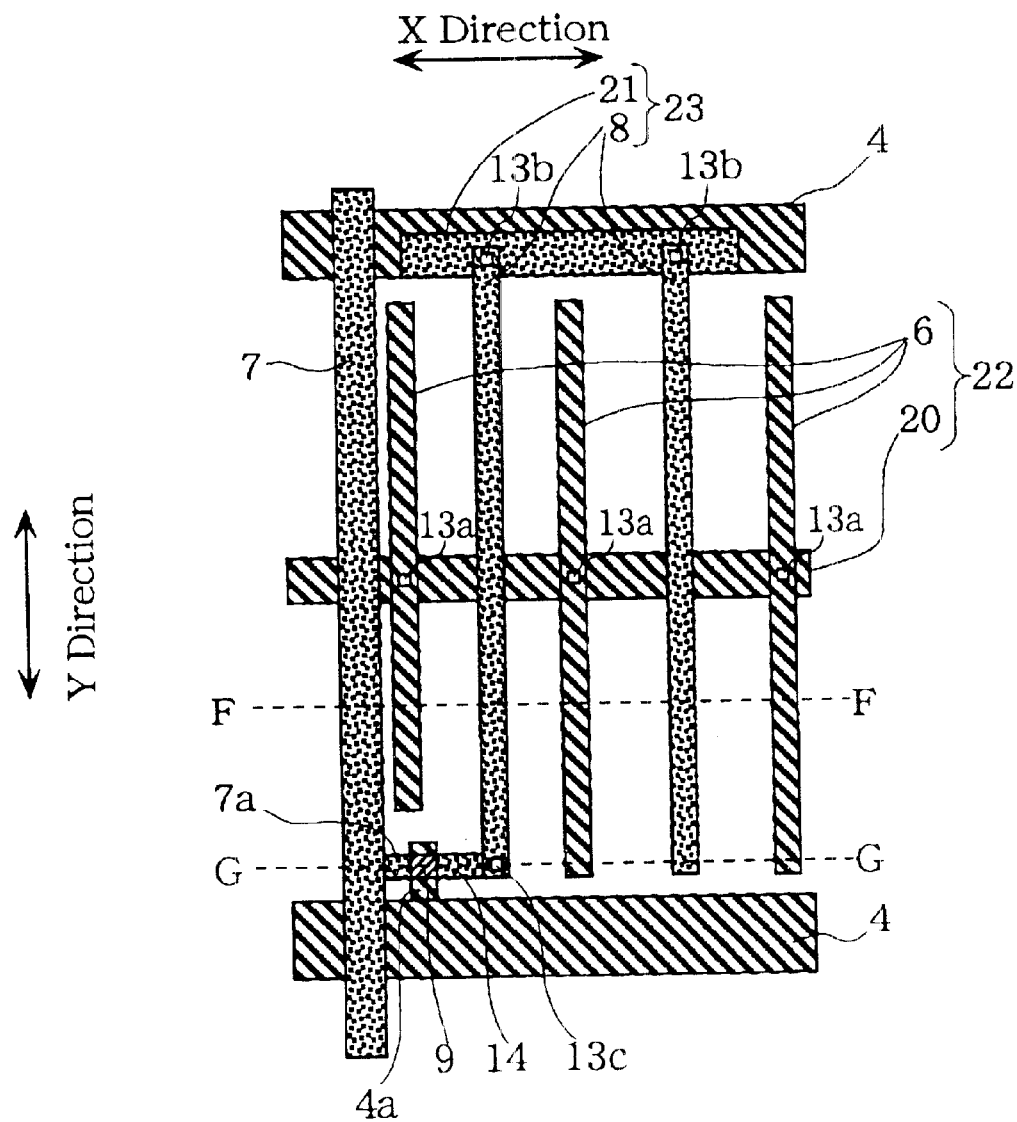
FIG. 26 is a top view schematically showing the structure of the liquid crystal panel in Example 2 of 2nd Embodiment.
Figure 27:
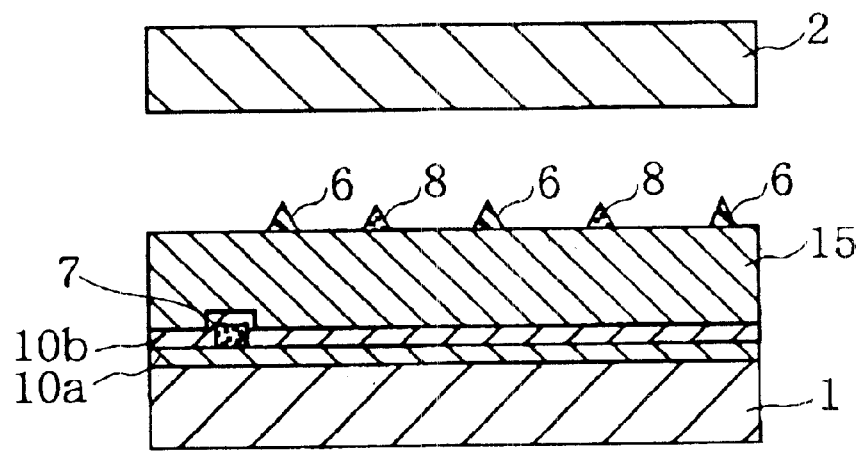
FIG. 27 is a sectional view taken along line F—F of FIG. 26.
Figure 28:
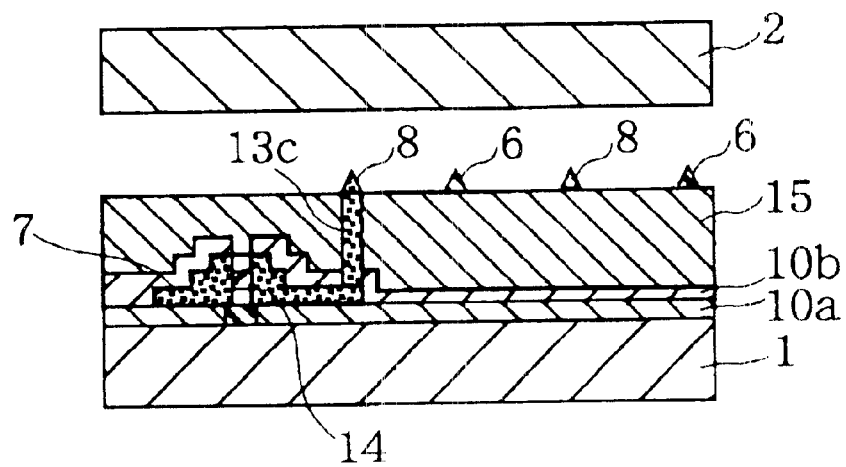
FIG. 28 is a sectional view taken along line G—G of FIG. 26.
Figure 29:
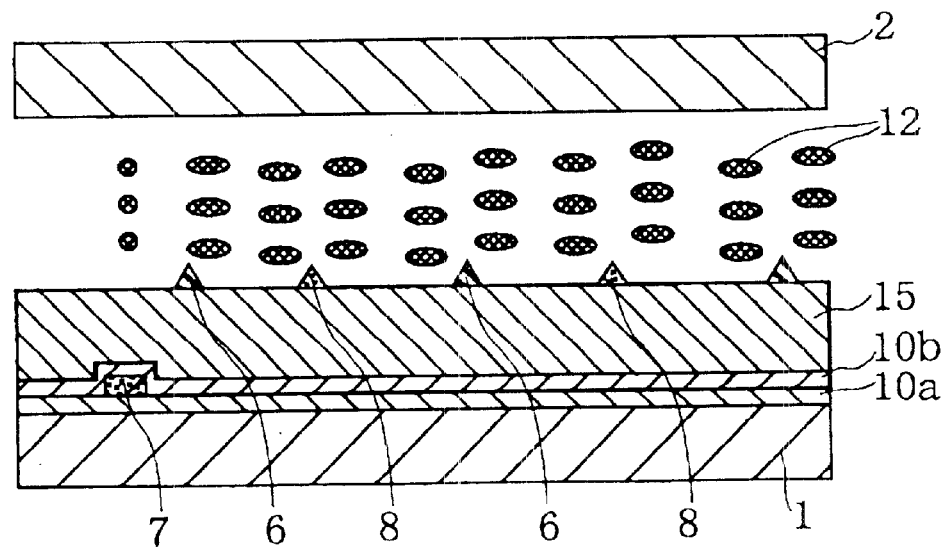
FIG. 29 is a sectional view schematically showing the operating state of the liquid crystal panel in Example 2 of 2nd Embodiment.

Example 2 according to 2 nd Embodiment of the present invention will be described with reference to FIGS. 26 through 29. FIG. 26 is a top view schematically showing the structure of the liquid crystal panel in Example 2 of 2 nd Embodiment; FIG. 27 is a sectional view taken along line F—F of FIG. 26; FIG. 28 is a sectional view taken along line G—G of FIG. 26; and FIG. 29 is a sectional view schematically showing the operating state of the liquid crystal panel in Example 2 of 2 nd Embodiment.

As shown in FIGS. 26 to 28, the scan signal lines 4 extending in a horizontal direction (hereinafter it is called "the X direction") are arranged on the glass substrate 1 of the array substrate. The wire protecting insulation film 10a is formed on the scan signal lines 4. The video signal lines 7 extending in a vertical direction (hereinafter it is called "the Y direction") are arranged on the insulation film 10a. The wire protecting insulation film 10b is formed on the video signal lines 7. The insulation film 15 is formed on the insulation film 10b, and the glass substrate 2 of the opposing plate is arranged over the insulation film 15. The liquid crystals (not shown) are sealed in between the glass substrate 2 and the insulation film 15.

A pair of comb pixel electrodes 23 and the common electrodes 22 are arranged on the insulation film 15. The pixel electrodes 23 comprise the pixel electrode parts 8 . . . extending linearly to be in parallel to each other (extending in the Y direction) and the leads 21 interconnecting the pixel electrode parts 8 . . . (extending in the X direction). On the other hand, the comb common electrodes 22 comprise the common electrode parts 6 . . . extending linearly to be in parallel to each other (extending in the Y direction) and the leads 20 (extending in the X direction) interconnecting the common electrode parts 6 . . . . The pixel electrode parts 8 . . . and the common electrode parts 6 . . . are formed to have a triangular section and are alternately formed. The pixel electrode parts 8 . . . and the leads 21 are connected to each other through the contact holes 13b . . . , and the common electrode parts 6 . . . and the leads 20 are connected to each other through the contact holes 13a . . . .

Further, the semiconductor layers (TFT: Thin Film Transistor) 9 as the active elements (switching elements) are arranged at intersecting points of the scan signal lines 4 and the video signal lines 7. When the semiconductor layers 9 are put into ON mode with application of the signals from the scan signal lines 4 to the gates 4a, a video signal voltage from the video signal lines 7 is applied to the pixel electrodes 23 through the sources 7a and the drains 14.

With the structure, the horizontal electric field is generated between the pixel electrode parts 8 . . . of the pixel electrodes 23 and the common electrode parts 6 . . . , and as such can allow the liquid crystal molecules to turn in a place of the substrate to do the drive for display of the liquid crystal layer.

The liquid crystal panel thus structured is produced in the process step that the video signal lines 7 and the scan signal lines 4 are formed into a matrix form as a metallic wiring on the glass substrate 1 and then the semiconductor layers 9 are formed at the intersecting points of those lines. Specifically, the liquid crystal panel was produced in the following process steps.

First, after the scan signal lines 4 and the leads 20 of the common electrodes 22 were formed of metal such as Al, the insulation film 10a of $SiO_2$ and the like was formed for protection of these wires and further the TFT was formed as the semiconductor layer 9 on the insulation film. Then, after the video signal lines 7, the sources 7a and the drains 14 were formed of metal comprising Al/Ti, the insulation layer 10b formed of $SiO_2$ and the like were formed for protection of these wires. Subsequently, the insulation film 15 was formed on the insulation film 10b by the following process steps, using photosensitive acrylic resin (PC302: available from JSR) which is photo-curing resin. After the array substrate was coated with PC302 by the spin coat method, it was subjected to pre-bake at 80° C. for 1 minute and in turn to exposure in 300 mJ/cm² from the glass substrate 1 side. Thereafter, the coated substrate was developed in developing solution (CD702AD) at 25° C. for 1 minute. After having been washed with flowing water, it was subjected to post-bake at 200° C. for 1 hour (it rises beyond room temperature), to thereby form the insulation film 15 having the film thickness of 1.5 $\mu$m.

For good insulating property of the insulation film and substantial flatness of the pixel electrodes and the transparent electrodes, it is preferable that the insulation film has a film thickness of 1 $\mu$m or more. Also, in the case where light is allowed to enter from the glass substrate 1 side, it is preferable to allow diffused light to enter therefrom (by allowing light to enter from a horizontal direction as well or allowing light to enter through a diffusing plate).

After the insulation film 15 was produced in the above-mentioned process, the contact holes 13a, 13b and 13c were formed in the insulation film 15. Thereafter, the pixel electrode parts 8 . . . of the pixel electrodes 23 connected with the drains 14 were formed by transparent conductive film (ITO: indium oxide-tin oxide). This brings the drains 14 and the pixel electrode parts 8 . . . of the pixel electrodes 23 into contact with each other through the contact holes 13c and also brings the leads 21 of the pixel electrodes 23 and the pixel electrode parts 8 . . . of the pixel electrodes 23 into contact with each other through the contact holes 13b . . . .

Next, the pixel electrode parts 8 . . . are formed to have a triangular section by taper etching. Then, the common electrode parts 6 . . . are formed by transparent conductive film of ITO. This process brings the leads 20 of the common electrodes 22 and the common electrode parts 6 . . . into contact with each other through the contact holes 13a . . . . The common electrode parts 6 . . . are also formed to have a triangular section by taper etching.

It may be conceivable that the scan signal lines 4 and the video signal lines 7 are formed of ITO, but, in view of the fact that when the signal lines 4, 7 are formed of ITO, the wiring resistance increases too much (the value of resistance of ITO is 100–500 $\mu\Omega$cm, while that of Al is 4 $\mu\Omega$cm), it is desirable that the signal lines 4, 7 are formed of metal of small wiring resistance, such as Al. For protection of the pixel electrode parts 8 . . . of the pixel electrodes 23 or the common electrode parts 6 . . . of the common electrodes 22, the insulation film of SiNx may be formed on those parts after the pixel electrode parts 8 . . . and the common electrode parts 6 . . . are formed (not shown in this Example).

Subsequently, alignment layers (AL5417: available from JSR) were printed on the glass substrate 1 and the glass substrate 2 and then were subjected to the rubbing. Thereafter, sealing resin (STRUCT BOND: available from MITSUI TOATSU CHEMICALS, INC.) was printed on a marginal portion of the glass substrate 1. Spacers composed of glass fibers of 4.0 $\mu$m (available from NIPPON ELECTRIC GLASS CO., LTD.) were mixed in the sealing resin.

Thereafter, resin balls having the diameter of 3.5 $\mu$m (EPOSTER-GP-HC: available from NIPPON SHOKUBAI CO., LTD.) were sprayed as the spacers in the display region in order to keep the distance between the substrates. Thereafter, the glass substrate 1 and the glass substrate 2 were bonded together, and the sealing resin was cured by heating at 150° C. for 2 hours.

Subsequently, liquid crystals (MT5087: available from Chisso Corporation) was injected into the empty panel thus produced by the vacuum injection method (in which the empty panel is placed to be evacuated in a tank of reduced pressure; the injection port is put into contact with the liquid crystals; and the pressure in the tank is returned to the ordinary pressure, so as to inject the liquid crystals into the panel).

Finally, photo-curing resin (LOCTITE352A: available from LOCTITE JAPAN CORPORATION) used as sealing resin was applied to the entirety of the injection port of the liquid crystal panel and then irradiated with light in 10 mW/cm² for 5 minutes to cure the sealing resin. Thereafter, polarizing plates (NPF-HEG1425DU: available from NITTO DENKO CORPORATION) are stuck on top and bottoms ides of the glass substrates 1 and 2 (on the outside surfaces of the glass substrates). Thus, the liquid crystal panel was produced.

For the sake of comparison, a liquid crystal panel of Comparative Example was produced in which the pixel electrode parts 8 . . . of the pixel electrodes 23 and the common electrode parts 6 . . . of the common electrodes 22 were formed into a rectangular shape, as in the prior art. Comparison was made between the performances of the liquid crystal panel of the present invention and those of the liquid crystal panel of Comparative Example. The results are given below.

Figure 45:
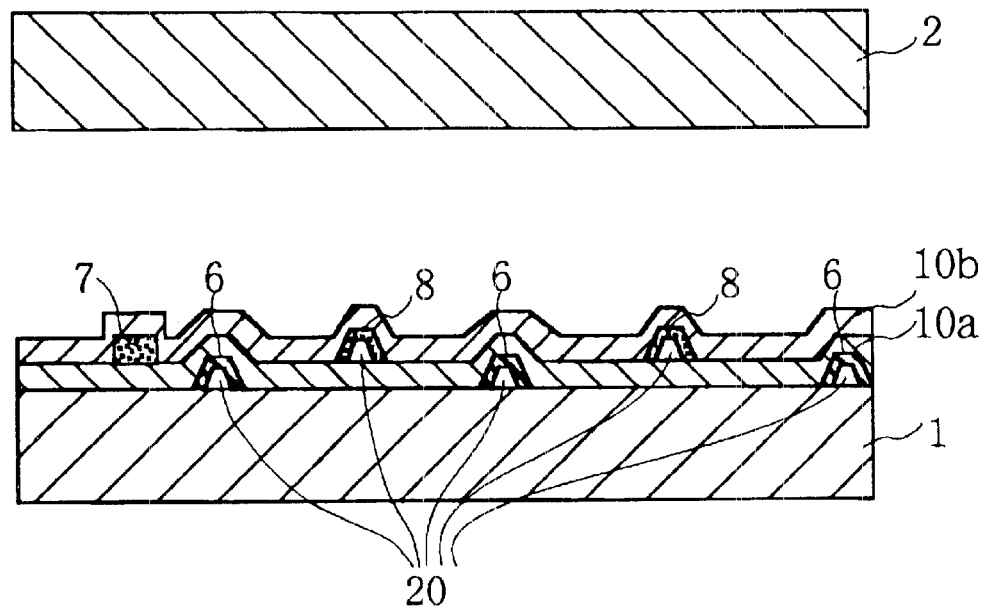
FIG. 45 is a sectional view showing the structure of the liquid crystal panel in Example 6 of 2nd Embodiment.

First, when the both liquid crystal panels were observed under a microscope with a voltage applied thereto, the following was found. In the liquid crystal panel of Comparative Example, since the horizontal electric field being not fully applied to the liquid crystal molecules 12 over the electrodes, no operation of the liquid crystal molecules 12 was found in the related parts, as shown in FIG. 45. Thus, the liquid crystal panel of Comparative Example was found to have insufficient brightness. In contrast to this, in the liquid crystal panel of the present invention, since the horizontal electric field is fully applied also to the liquid crystal molecules 12 over the electrodes, operation of the liquid crystal molecules 12 was found in the related parts as well, as shown in FIG. 29. Thus, the liquid crystal panel was found to have sufficient brightness.

Figure 30:
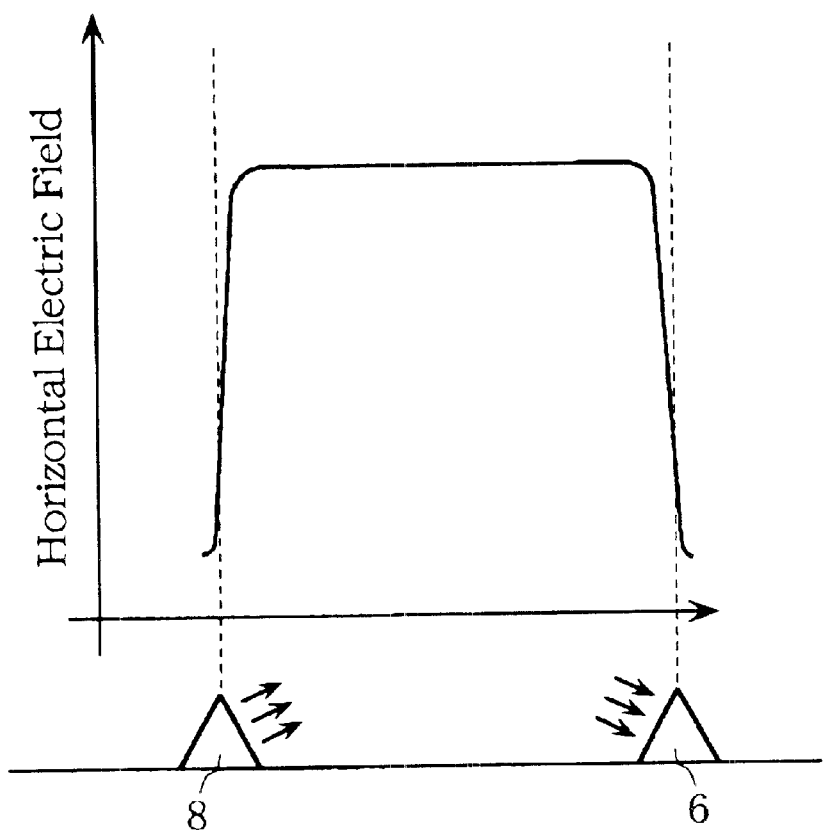
FIG. 30 is a graph giving an outline of a simulation of the electric field being applied to the liquid crystal panel of Example 2 of 2nd Embodiment.
Figure 48:
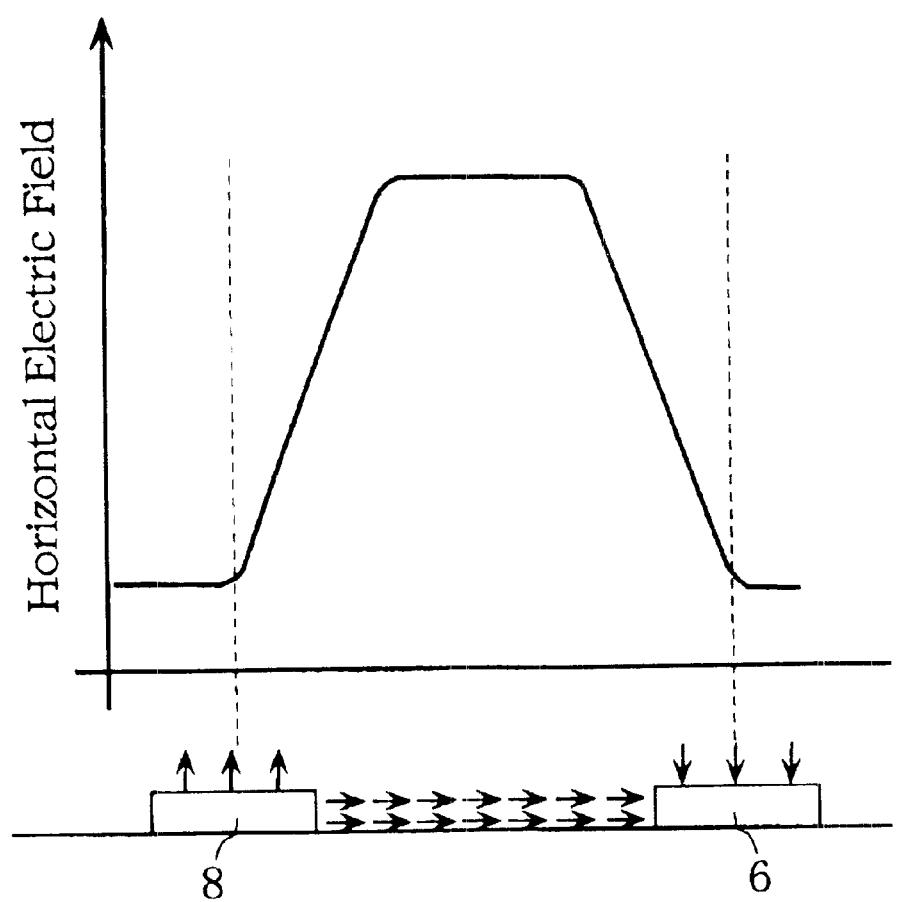
FIG. 48 is a graph giving an outline of a simulation of the electric field being applied to the conventional liquid crystal panel.

FIG. 30 is a graph giving an outline of a simulation of the electric field being applied to the liquid crystal panel of Example 2 of 2nd Embodiment. On the other hand, FIG. 48 is a graph giving an outline of a simulation of the electric field being applied to the conventional liquid crystal panel. Arrows indicate an electric line of flux. It is understood from these graphs that in the conventional liquid crystal panel, the vertical electric field is being solely applied onto the pixel electrode parts 8 and the common electric parts 6, while on the other hand, in the liquid crystal panel of the present invention, the horizontal electric field is being applied onto the pixel electrode parts 8 and the common electrode parts 6.

Figure 33:
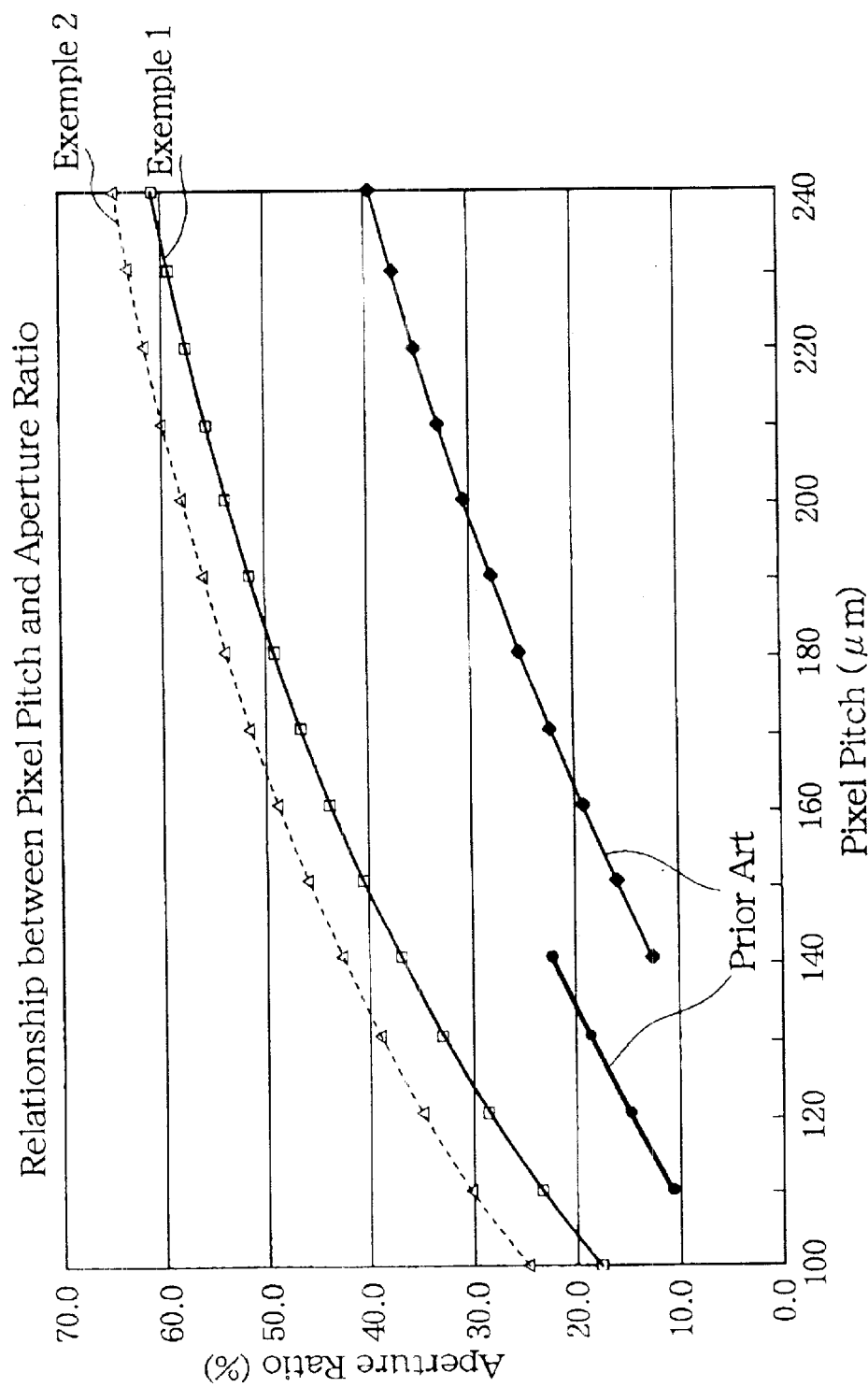
FIG. 33 is a graph giving the relationship between an aperture ratio and a pixel pitch in conventional liquid crystal panels produced by a known manner as well as in liquid crystal panels produced in Examples 1 and 2 of 2nd Embodiment.

Shown in FIG. 33 is the relationship between an aperture ratio and a pixel pitch in each of the conventional liquid crystal panels produced by a known manner as well as in liquid crystal panels produced in Examples 1 and 2 of 2nd Embodiment. It is under stood from FIG. 33 that the aperture ratios of the liquid crystal panels produced in Examples 1 and 2 of 2nd Embodiment were both drastically improved, as compared with those of the conventional liquid crystal panels, and that the liquid crystal panel produced in Example 2 had an improved aperture ratio, as compared with that in Example 1. Thus, the insulation film 15 formed as in Example 2 enables the aperture ratio to increase and also enables the opposing area of the pixel electrode parts 8 . . . of the common electrodes 22 to increase. This can provide the result that the horizontal electric field is easily applied to the liquid crystal molecules and thus the liquid crystal molecules can easily shift in position.

In addition, in the liquid crystal panel of the present invention, since the pixel electrode parts 8 . . . and common electrode parts 6 . . . are formed to have the triangular section, upward orienting parts of the pixel electrode parts 8 . . . and common electrode parts 6 . . . become narrower (in other words, only the apexes of the striped projection parts orient upwardly). This contributes to reduction of the application of the vertical electric field and results in increase of the application of the horizontal electric field to a sufficient extent.

Further, it is well known that the speed of response is proportional to the square of a distance between the pixel electrode parts 8 . . . and the common electrode parts 6 . . . and it is needless to say that the distance therebetween should be shortened. In the present liquid crystal panel, the distance between the electrodes is the order of 12 μm and the speed of response is as slow as the order of 60 msec. In view of this, it may be conceivable that the distance between the pixel electrode parts 8 . . . and the common electrode parts 6 . . . is narrowed to produce increased speed of response. However, since the conventional pixel electrode parts 8 . . . and common electrode parts 6 . . . are not formed by the transparent electrodes, the narrowing of the distance therebetween results in increase in the number of electrodes to that extent and thus decrease in the aperture ratio.

In contrast to this, with the construction of the present invention having the pixel electrode parts 8 . . . and common electrode parts 6 . . . formed by the transparent electrodes, even when the distance between the pixel electrode parts 8 . . . and the common electrode parts 6 . . . is narrowed to provide increased number of electrodes, the decrease in the aperture ratio can be prevented. Thus, while the decrease of the aperture ratio is prevented, the speed of response can be increased by narrowing the distance between the electrodes. It was confirmed that with the distance between the electrodes reduced to be 6 μm, the drive was effected at the speed of response of 15 msec or less enough for adequate display of a moving image.

Figure 31:
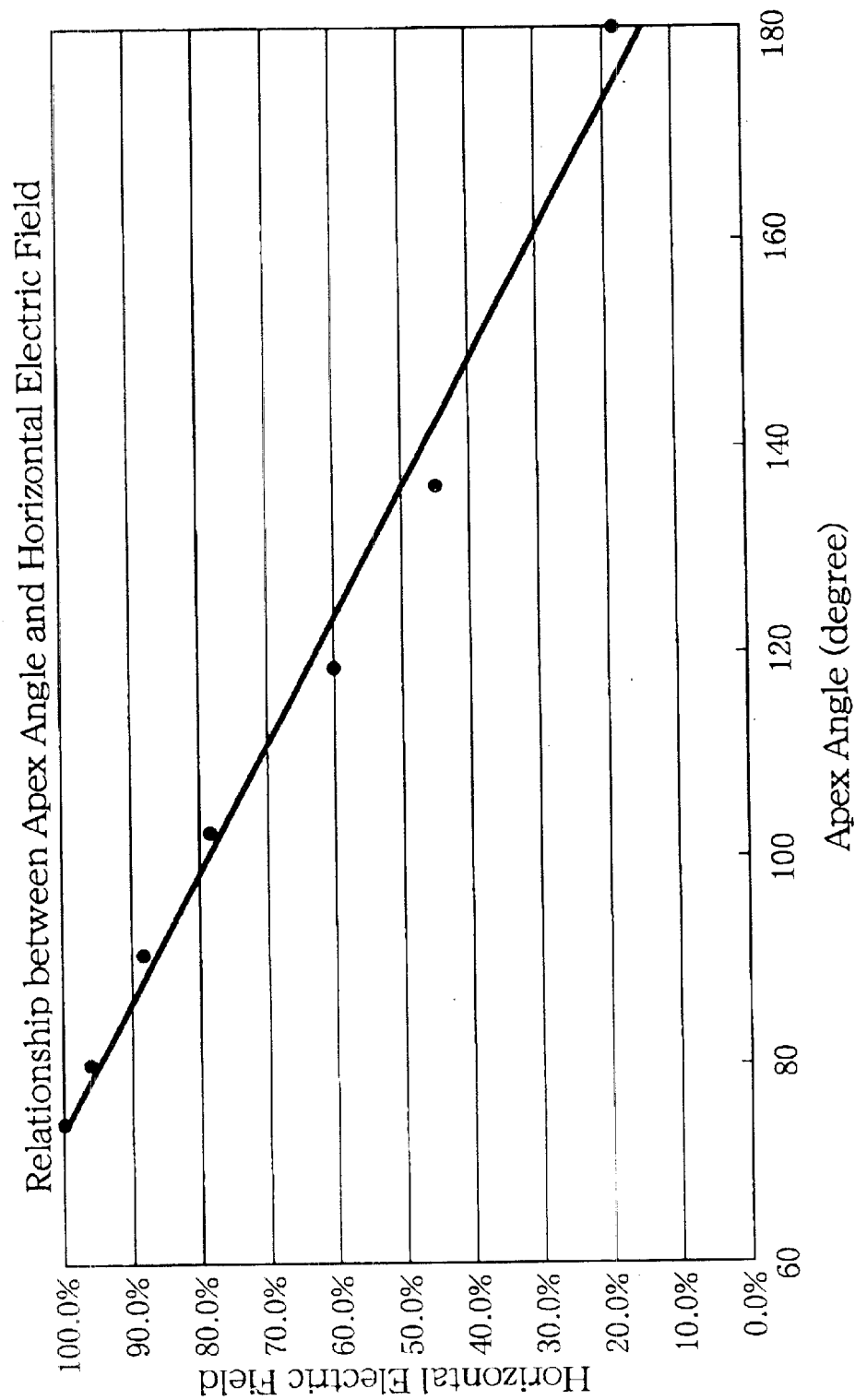
FIG. 31 is a graph giving the relationship between an apex angle of a top of a triangle and strength of horizontal electric field at a point inwardly a distance of 2 μm from the electrode end.

Shown in FIG. 31 is the relationship between an apex angle of a top of a triangle and strength of horizontal electric field at a point inwardly a distance of 2 μm from the electrode end. It is to be noted here that the horizontal electric field applied across both electrodes of conventional construction is taken to be 100%, which also applies to FIG. 32 below. It was found from this result that with the apex angle of 135 degree or less, the horizontal electric field of 50% or more was being applied, or particularly with the apex angle of 110 degree or less, the horizontal electric field of 70% or more was being applied. Accordingly, the apex angle is preferably 135 degree or less, further preferably, 110 degree or less.

Figure 32:
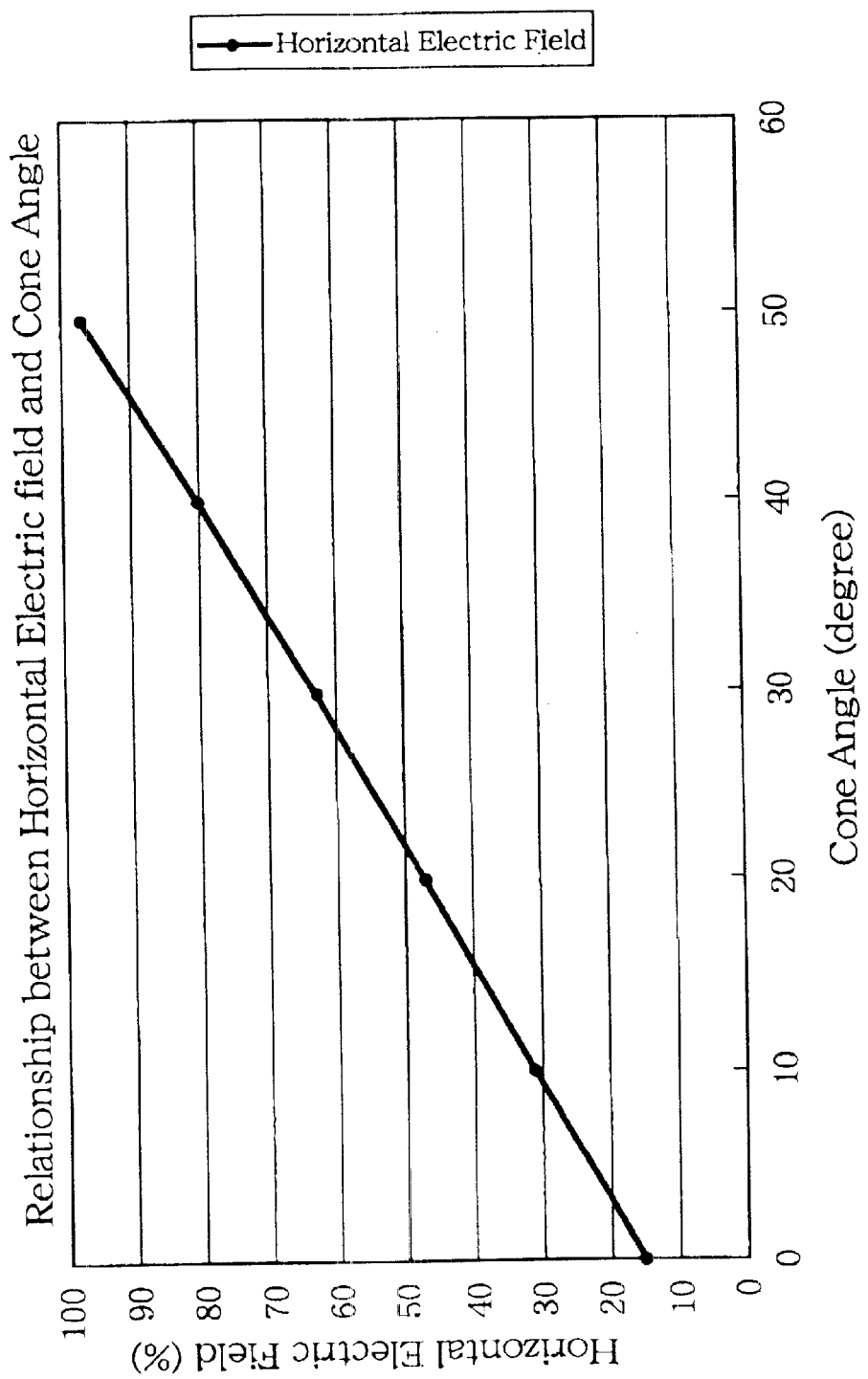
FIG. 32 is a graph giving the relationship between a cone angle of the triangle and strength of horizontal electric field at a point inwardly a distance of 2 μm from the electrode end.
Figure 34:
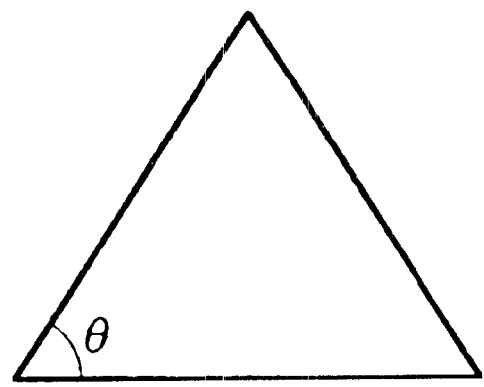
FIG. 34 is an illustration of a cone angle.
Figure 35:
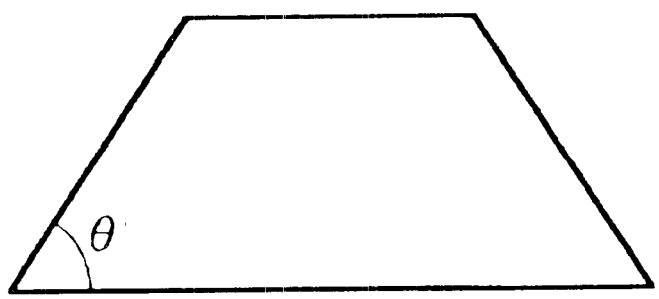
FIG. 35 is an illustration of a cone angle.

Further, shown in FIG. 32 is the relationship between a cone angle of the triangle and strength of horizontal electric field at a point inwardly a distance of 2 μm from the electrode end. The terminology of "cone angle" means an angle formed by the oblique side and the base of a triangle, as shown in FIG. 34, or in the case of a trapezium section, an angle formed by the oblique side and the base of the trapezium, as shown in FIG. 35. It was found from FIG. 32 that with the cone angle of 20 degree or more, the horizontal electric field was being applied, or particularly, with the cone angle of 45 degree or more, the horizontal electric field of 85% or more was being applied. Accordingly, the cone angle is preferably 20 degree or more, further preferably, 45 degree or more.

The insulation film 15 used in Example 2 of 2nd Embodiment may be formed by a color filter. This can eliminate the need for the color filter to be arranged on the common electrode side. As a result of this, high precision is not required in bonding the top and bottom substrates together and the aperture ratio can be increased.

EXAMPLE 3

Figure 36:
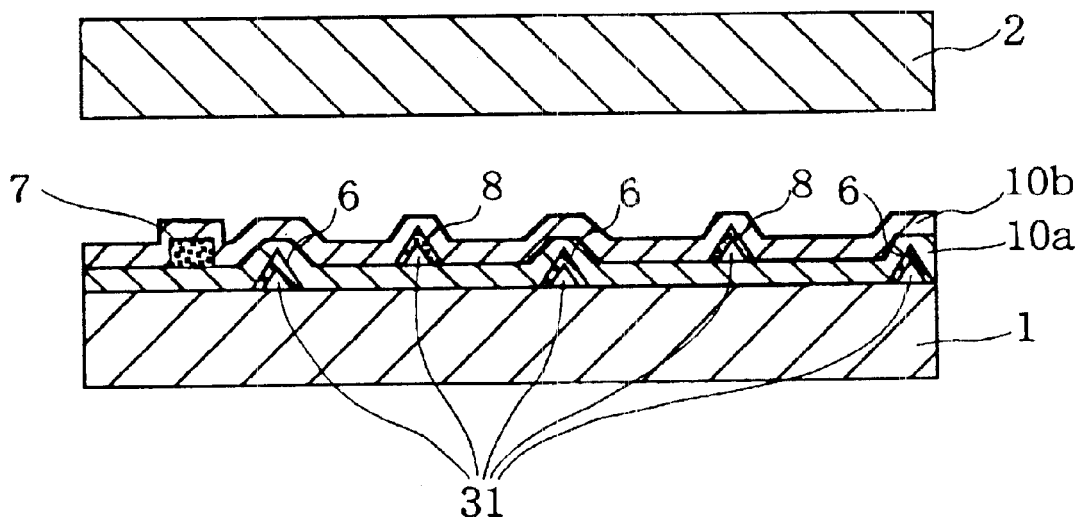
FIG. 36 is a sectional view showing the structure of the liquid crystal panel in Example 3 of 2nd Embodiment.
Figure 37:
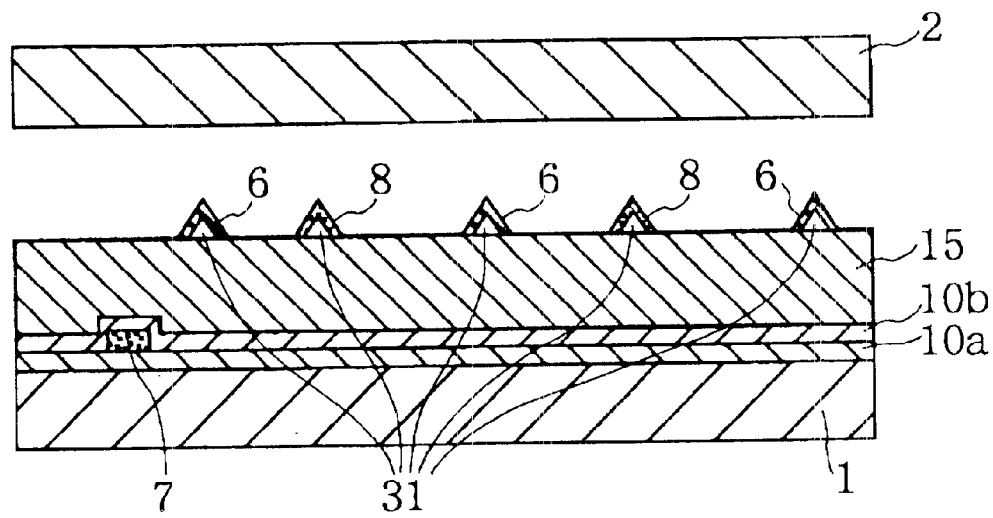
FIG. 37 is a sectional view showing the structure of the liquid crystal panel according to a variant in Example 3 of 2nd Embodiment.
Figure 38:
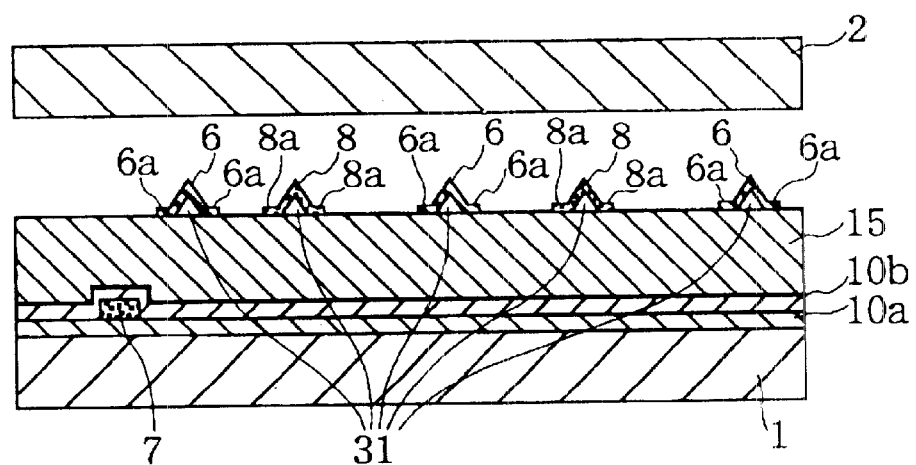
FIG. 38 is a sectional view showing the structure of the liquid crystal panel according to a further variant in Example 3 of 2nd Embodiment.

Example 3 according to 2nd Embodiment of the present invention will be described with reference to FIGS. 36 through 38. FIG. 36 is a sectional view showing the structure of the liquid crystal panel in Example 3 of 2nd Embodiment; FIG. 37 is a sectional view showing the structure of the liquid crystal panel according to a variant in Example 3 of 2nd Embodiment; and FIG. 38 is a sectional view showing the structure of the liquid crystal panel according to a further variant in Example 3 of 2nd Embodiment.

As shown in FIG. 36, the liquid crystal panel shown in Example 3 is identical in construction to Example 1, except the construction that the pixel electrode parts 8 . . . of the pixel electrodes 23 and the common electrode parts 6 . . . of the common electrodes 22 are formed on the transparent insulation layers 31 having a triangular section.

The specific forming method will be given below.

First, the scan signal lines 4 and the leads 20 of the common electrodes 22, which are formed of metal such as Al, are formed on the glass substrate 1. Then, the transparent insulation layer 31 was formed on the array substrate 1 at positions corresponding to the positions of the common electrode parts 6 . . . by the following process steps, using photosensitive acrylic resin (PC403: available from JSR) which is photo-curing resin. Specifically, after the array substrate 1 was coated with PC403 by the spin coat method, it was subjected to pre-bake at 90° C. for 2 minutes and in turn to exposure in 300 mJ/cm$^2$. Thereafter, the coated substrate was developed in developing solution (PD523AD) at 25° C. for 1 minute. After having been washed with flowing water, it was subjected to post-bake in an oven at 110° C. for 2 minutes and then subjected to post-bake at 220° C. for 1 hour, to thereby form the triangular transparent insulation layers 31 of 1 μm in height and 5 μm in width. The rapid post-bake can allow the insulation layers to be tapered, to thereby produce the triangular transparent insulation layers 31.

Thereafter, the common electrode parts 6 . . . formed by the transparent conductive film (ITO: indium oxide-tin oxide) were formed on the transparent insulation layers 31. Then, the insulation film 10a of SiO$_2$ and the like was formed for protection of these wires and further the TFT was formed was the semiconductor layer 9 on the insulation film.

Then, after the video signal line 7, the source 7a and the drain 14 were formed of metal of Al/Ti or the like, the leads 21 were formed in the X direction and the triangular transparent insulation layers 31 were formed at positions corresponding to the positions of the pixel electrode parts 8 in the same manner as the above.

The pixel electrode parts 8 . . . formed by the transparent conductive film (ITO: indium oxide-tin oxide) connected with the drain 14 were formed on these triangular transparent insulation layers 31. Then, the insulation film 10b of SiNx and the like was formed for protection of these wires. Thereafter, the liquid crystal display element was produced in the same manner as in Example 1. In a variant as shown in FIG. 37, such a process step may be taken that after the insulation film 15 is formed, the triangular insulation layers 31 are formed thereon and then the pixel electrode parts 8 . . . or the common electrode parts 6 . . . are formed on the transparent insulation layers 31 . . . . Also, the insulation film 15 may be formed by a color filter.

It was found that this variant could also allow a sufficient horizontal electric field to be applied to the liquid crystal molecules 12 over the electrodes, to enable operation of the liquid crystal molecules in the concerned parts to thereby produce the liquid crystal panel of sufficient brightness.

The pixel electrode parts 8 . . . and the common electrode parts 6 . . . as are formed by the transparent electrodes can provide increase aperture ratio. Also, the variant of FIG. 37 in which the pixel electrode parts 8 . . . or the common electrode parts 6 . . . are formed on the transparent insulation layers 31 enables the opposing area of the pixel electrode parts 8 . . . of the pixel electrodes 23 and the common electrode parts 6 . . . of the common electrodes 22 to increase. This can provide the result that the horizontal electric field is easily applied to the liquid crystal molecules and thus the liquid crystal molecules can easily shift in position.

In addition, since the liquid crystal panel of the present invention includes the pixel electrode parts 8 . . . and common electrode parts 6 . . . having the triangular section, upward orienting parts of the pixel electrode parts 8 . . . and common electrode parts 6 . . . become narrower (in other words, only the apexes orient upwardly), as compared with the liquid crystal panels of Comparative Examples. This contributes to reduction of the application of the vertical electric field and results in increase of the application of the horizontal electric field to a sufficient extent.

In a further variant as shown in FIG. 38 in which the pixel electrode parts 8 and the common electrode parts 6 are formed on the transparent insulation layer 31, the pixel electrode parts 8 and the common electrode parts 6 can be reliable formed in the manufacturing process by simultaneously forming marginal portions 8a, 8a of the pixel electrode parts 8 and marginal portions 6a, 6a of the common electrode parts 6.

EXAMPLE 4

Figure 39:
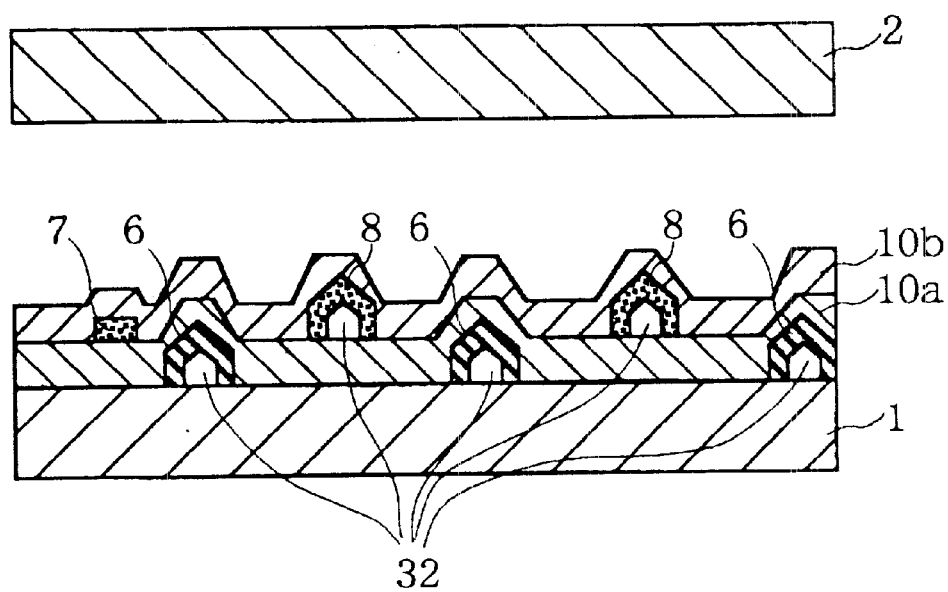
FIG. 39 is a sectional view showing the structure of the liquid crystal panel in Example 4 of 2nd Embodiment.
Figure 40:
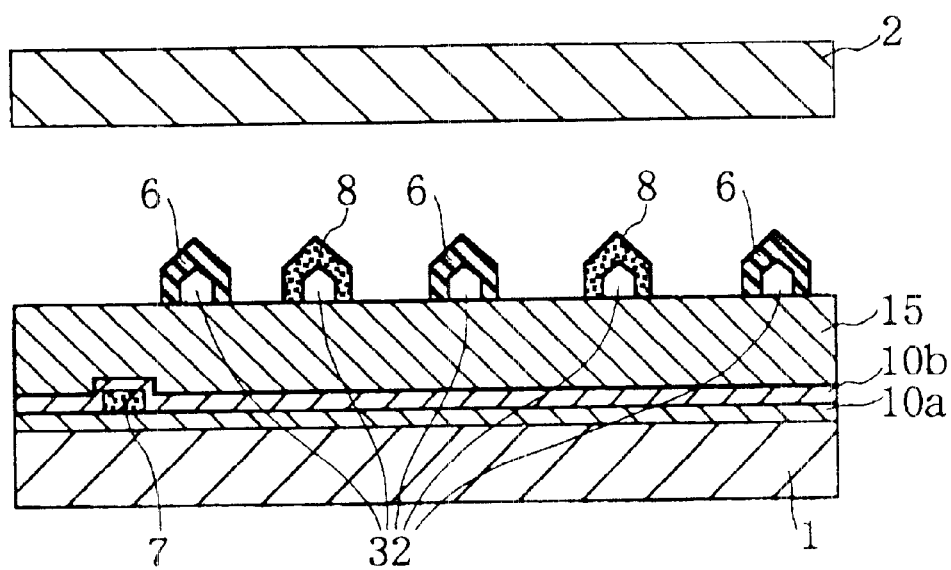
FIG. 40 is a sectional view showing the structure of the liquid crystal panel according to a variant in Example 4 of 2nd Embodiment.

Example 4 according to 2nd Embodiment of the present invention will be described with reference to FIGS. 39 and 40. FIG. 39 is a sectional view showing the structure of the liquid crystal panel in Example 4 of 2nd Embodiment; and FIG. 40 is a sectional view showing the structure of the liquid crystal panel according to a variant in Example 4 of 2nd Embodiment.

As shown in FIG. 39, the liquid crystal panel shown in Example 4 is identical in construction to Example 1, except the construction that the pixel electrode parts 8 . . . of the pixel electrodes 23 and the common electrode parts 6 . . . of the common electrodes 22 are formed on the transparent insulation layers 32 having a pentagonal section.

The specific forming method will be given below.

First, the scan signal lines 4 and the leads 20 of the common electrodes 22, which are formed of metal such as Al, are formed on the glass substrate 1. Then, the transparent insulation layers 32 were formed on the array substrate 1 at positions corresponding to the positions of the common electrode parts 6 . . . by the following process steps, using photosensitive acrylic resin (PC403: available from JSR) which is photo-curing resin. Specifically, after the array substrate 1 was coated with PC403 by the spin coat method, it was subjected to pre-bake at 90° C. for 2 minutes and in turn to exposure in 300 mJ/cm$^2$. Thereafter, the coated substrate was developed in developing solution (PD523AD) at 25° C. for 1 minute. After having been washed with flowing water, it was subjected to post-bake at 220° C. for 1 hour (it rises beyond room temperature), to thereby form the transparent insulation layers having a quadrangular section of 0.2 μm in height and 5 μm in width. Then, the transparent insulation layers having the triangular section were formed on the transparent insulation layers having the quadrangular section in the following method.

After the array substrate 1 was coated with PC403 by the spin coat method, it was subjected to pre-bake at 90° C. for 2 minutes and in turn to exposure in 300 mJ/cm². Thereafter, the coated substrate was developed in developing solution (PD523AD) at 25° C. for 1 minute. After having been washed with flowing water, it was subjected to post-bake in an oven at 110° C. for 2 minutes and then subjected to post-bake at 220° C. for 1 hour, to thereby form the triangular transparent insulation layers 32 of 1 μm in height and 5 μm in width. The rapid post-bake can allow the insulation layers to be tapered, to thereby produce the triangular transparent insulation layers. The transparent insulation layers 32 having a pentagonal section were produced by this method.

Thereafter, the common electrode parts 6 . . . formed of the transparent conductive film (ITO: indium oxide-tin oxide) were formed on the transparent insulation layers 32. Then, the insulation film 10a of SiO₂ and the like was formed for production of these wires and further the TFT was formed as the semiconductor layer 9 on the insulation film.

Then, after the video signal line 7, the source 7a and the drain 14 were formed of metal of Al/Ti or the like, the leads 21 were formed in the X direction and the pentagonal transparent insulation layers 32 were formed at positions corresponding to the positions of the pixel electrode parts 8 . . . in the same manner as the above.

The pixel electrode parts 8 . . . formed of the transparent conductive film (ITO: indium oxide-tin oxide) connected with the drain 14 were formed on these transparent insulation layers 32 having a pentagonal section. Then, the insulation film 10b of SiNx and the like was formed for protection of these wires. Thereafter, the liquid crystal display element was produced in the same manner as in Example 1. In a variant as shown in FIG. 40, such a process step may be taken, as is the case with Example 2, that after the insulation film 15 was formed, the transparent layers 32 are formed thereon and then the pixel electrode parts 8 . . . or the common electrode parts 6 . . . are formed on the transparent insulation layers 32 . . . . Also, the insulation film 15 may be formed by a color filter.

It was found that this variant could also allow a sufficient horizontal electric field to be applied to the liquid crystal molecules 12 over the electrodes, to enable operation of the liquid crystal molecules 12 in the concerned parts to thereby produce the liquid crystal panel of sufficient brightness.

The pixel electrode parts 8 . . . and the common electrode parts 6 . . . as are formed by the transparent electrodes can provide increased aperture ratio. Also, the variant of FIG. 40 in which the pixel electrode parts 8 . . . or the common electrode parts 6 . . . are formed on the transparent insulation layers 32 enables the opposing area of the pixel electrode parts 8 . . . of the pixel electrodes 23 and the common electrode parts 6 . . . of the common electrodes 22 to increase. This can provide the result that the horizontal electric field is easily applied to the liquid crystal molecules and thus the liquid crystal molecules can easily shift in position.

EXAMPLE 5

Figure 41:
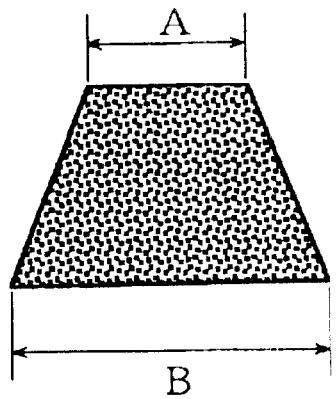
FIG. 41 is a sectional view showing the sectioned shape of a pixel electrode part or a common electrode part in Example 5 of 2nd Embodiment.
Figure 42:
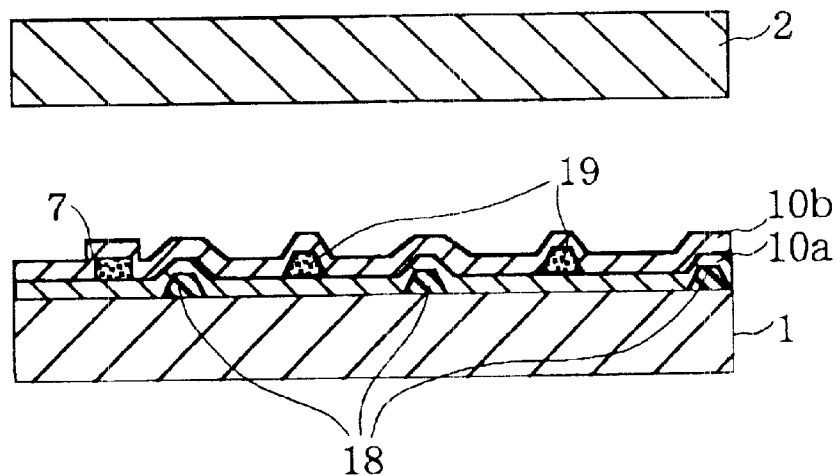
FIG. 42 is a sectional view showing the structure of the liquid crystal panel in Example 5 of 2nd Embodiment.
Figure 43:
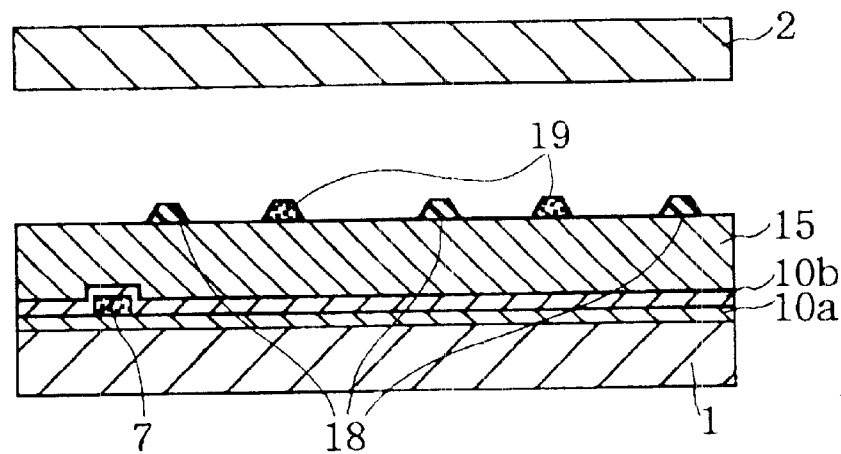
FIG. 43 is a sectional view showing the structure of the liquid crystal panel according to a variant in Example 5 of 2nd Embodiment.

Example 5 according to 2nd Embodiment of the present invention will be described with reference to FIGS. 41 to 44. FIG. 41 is a sectional view showing the sectioned shape of a pixel electrode part or a common electrode part in Example 5 of 2nd Embodiment; FIG. 42 is a sectional view showing the structure of the liquid crystal panel in Example 5 of 2nd Embodiment; FIG. 43 is a sectional view showing the structure of the liquid crystal panel according to a variant in Example 5 of 2nd Embodiment; and FIG. 44 is a graph giving the relationship between a ratio between an upper side and a lower side of the sectioned shape of the pixel electrode part or the common electrode part in Example 5 of 2nd Example and contrast.

As shown in FIGS. 41 and 42, the liquid crystal panel shown in Example 5 is identical in construction to Example 1, except the construction that the pixel electrode parts 19 . . . of the pixel electrodes 23 and the common electrode parts 18 . . . of the common electrodes 22 are formed to have a trapezoidal section. The upper side A of the trapezoid is set to be 4 μm and the lower side (base) B of the same is set to be 6 μm. The trapezoidal electrodes can be determined by modifying the conditions of the taper etching method.

Shown in FIG. 42 is the sectional view showing the structure of the liquid crystal panel of Example 5, which has the feature that the pixel electric field parts 19 . . . and the common electric field parts 18 . . . are formed to have the trapezoidal section having tapered sides. This structures causes harder movement of the liquid crystal molecules over the electrodes than the structure of Example 1 (FIG. 23), but produces easier movement of the same and thus improved performance of display (contrast) than the structure of the prior art (FIG. 2).

Figure 44:
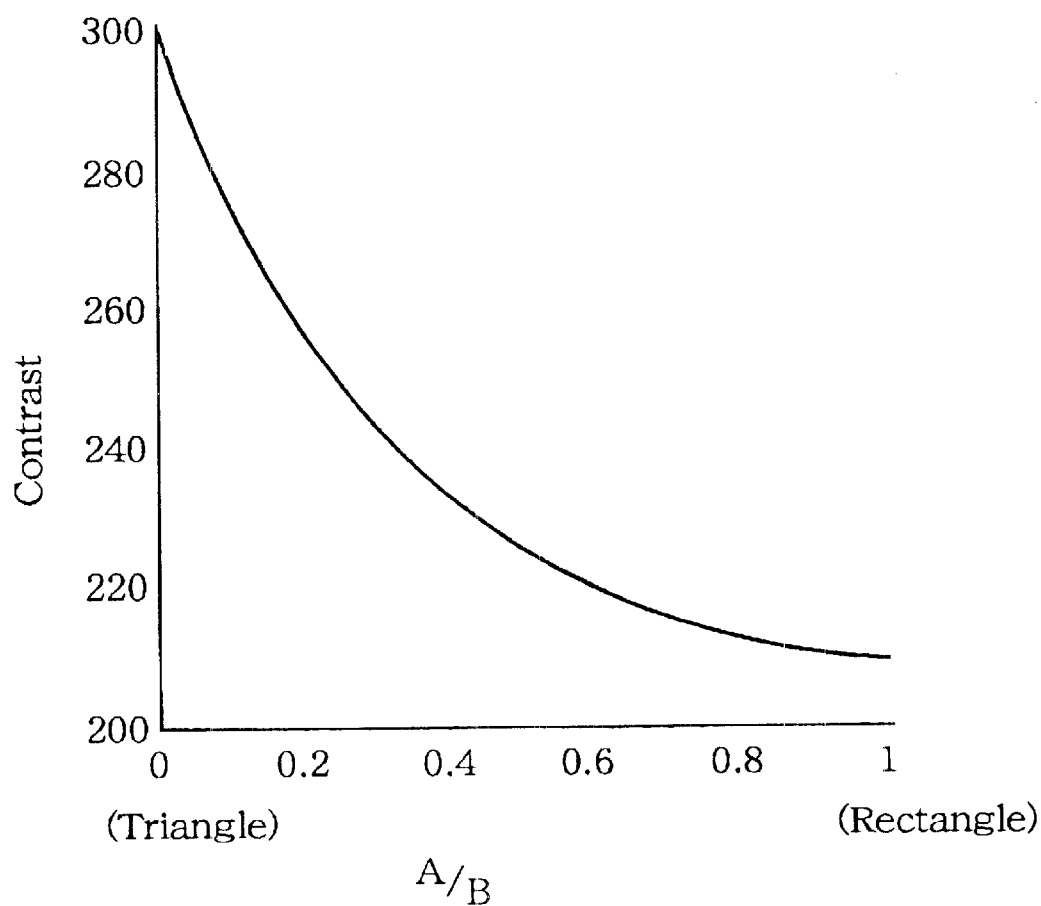
FIG. 44 is a graph giving the relationship between a ratio between an upper side and a lower side of the sectioned shape of the pixel electrode part or the common electrode part in Example 5 of 2nd Example and contrast thereat.

Shown in FIG. 44 is the relationship between a ratio between the upper side and the lower side of the sectioned shape of the pixel electrode part or the common electrode part in Example 5 and a contrast. It is seen from this Figure that the smaller the ratio of A/B is, the higher the contrast is. The ratio of A/B is preferably set to be not more than ⅔, or further preferably not more than ½. Also, as shown in FIG. 43, such a process step may be taken that after the insulation film 15 is formed, the pixel electrode parts 19 . . . or the common electrode parts 18 . . . are formed on the transparent insulation film 15, as is the case with Example 2. Also, the insulation film 15 may be formed by a color filter.

EXAMPLE 6

Figure 46:
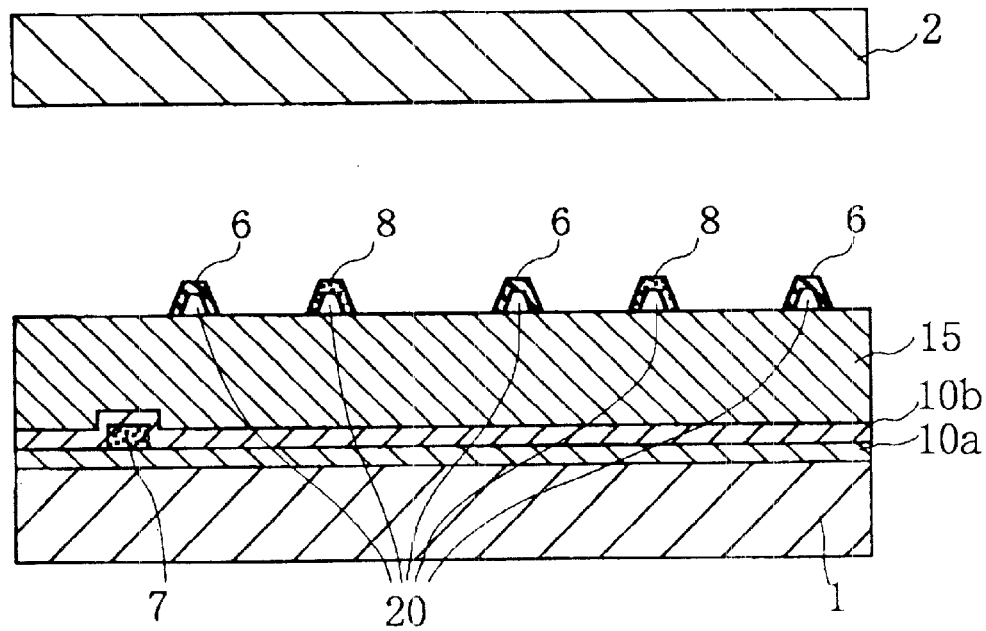
FIG. 46 is a sectional view showing the structure of the liquid crystal panel according to a variant in Example 6 of 2nd Embodiment.
Figure 47:
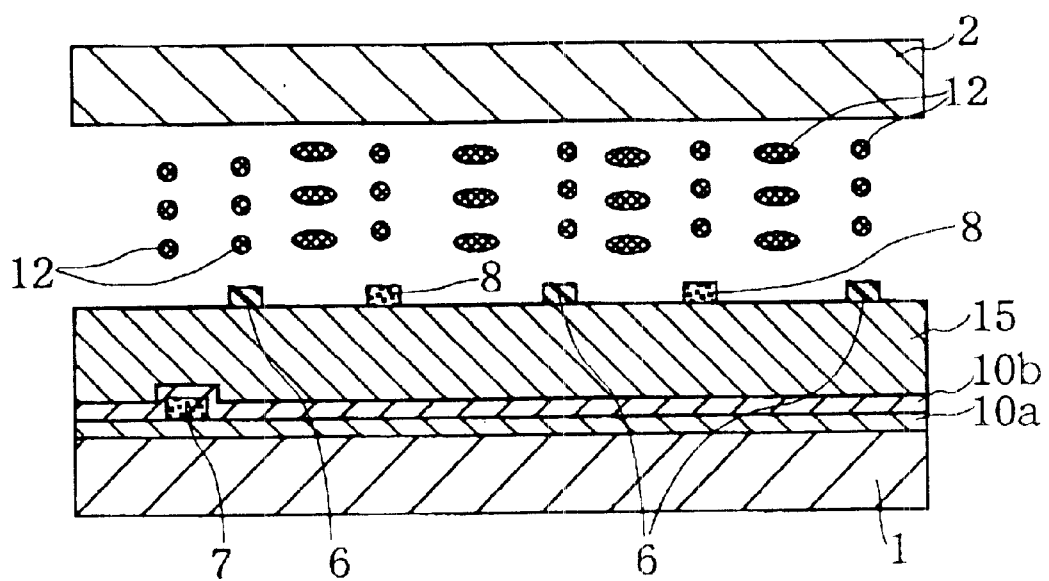
FIG. 47 is a sectional view schematically showing the operating state of the conventional liquid crystal panel.

Example 5 according to 2nd Embodiment of the present invention will be described with reference to FIGS. 45 and 46. FIG. 45 is a sectional view showing the structure of the liquid crystal panel in Example 6 of 2nd Embodiment; and FIG. 46 is a sectional view showing the structure of the liquid crystal panel according to a variant in Example 6 of 2nd Embodiment.

As shown in FIG. 45, in Example 6, the transparent insulation layers 20 . . . having a trapezoidal section and then the pixel electrode parts 8 . . . and the common electrode parts 6 . . . are formed on the transparent insulation layers. The upper side A of the trapezoid was set to be 4 μm and the lower side (base) B of the same was set to be 6 μm. The trapezoidal film can be formed by modifying the conditions of the post-bake.

This structure of Example 6 causes harder movement of the liquid crystal molecules over the pixel electrode parts 8 . . . and the common electrode parts 6 . . . than the structure of Example 3 (FIG. 36), but produces easier movement of the same than the structure of the prior art (FIG. 2) and thus produces improved contrast. A smaller ratio of A/B provides better display characteristic (contrast). The ratio of A/B is preferably set to be not more than ⅔, or further preferably not more than ½. Also, as shown in FIG. 46, such a process step may be taken that after the insulation film 15 is formed, the transparent insulation layers 20 . . . having the trapezoidal section and then the pixel electrode parts 8 . . . or the common electrode parts 6 . . . are formed on the transparent insulation layers 20. Also, the insulation film 15 may be formed by a color filter.

OTHER RESPECTS ON STRUCTURE OF EXAMPLES 1 to 6 OF 2ND EMBODIMENT (1) While MT5087 (available from Chisso Corporation) of positive dielectric constant anisotropy was used as the liquid crystal in the above-mentioned Examples, this is not of restrictive. The other commercially available liquid crystals, such as E-7 (available from British Drug House Ltd.), E-8 (available from British Drug House Ltd.), ZLI4792 (available from Merck Japan Limited), and TL202 (available from Merck Japan Limited), may also be used. ZLI4788 (available from Merck Japan Limited) of negative dielectric constant anisotropy may also be used. Also, the type of liquid crystal is not limited to Nematic. The other types, such as ferroelectricity liquid crystal and antiferroelectricity liquid crystal, may also be used. This means that the present invention is effective irrespective of type of liquid crystal material and alignment layer material.

(2) While the TFT of a three terminal element was used as the active element in the above-mentioned Examples, MIM (Metal-Insulator-Metal) of a two terminal element, a ZnO varistor, a SiNx diode, a a-Si diode and the like may also be used. Also, the transistor structure is not limited to the a-Si of a bottom-gate structure. The other transistor structure, such as that of a top-gate structure and a p-Si, may also be used. In addition, a drive circuit may be formed on the periphery of the substrate.

(3) While the glass substrate was used for the both substrates in the above-mentioned Examples, either or both of the substrates may be formed of film, plastics and the other material. Also, a glass substrate with ITO, a substrate with a color filter and the like may be used as the glass substrate 2 (the opposing substrate). A further alternative substrate forming a color filter on the glass substrate 1 side (the array substrate side) or on the glass substrate 2 side (the opposing substrate side) may also be used.

(4) An alignment layer able to produce an increased pre-tilt angle or a vertical alignment layer may be used as the alignment layer. When an alignment process using not rubbing process (e.g. the alignment process using light) is used, a further uniform alignment can be produced and thus an improved contrast can be provided. Further, the other method (e.g. the method in which prisms are formed of resin) than the spacer spraying method may be used to produce a uniform cell-gap.

While no electrodes are formed on the opposing substrate side (the glass substrate 2 side) in the Examples illustrated above, the electrodes may be formed on the opposing substrate side or alternatively conductive material may be formed thereon, instead of the electrodes.

3RD EMBODIMENT

EXAMPLE 1

Figure 49:
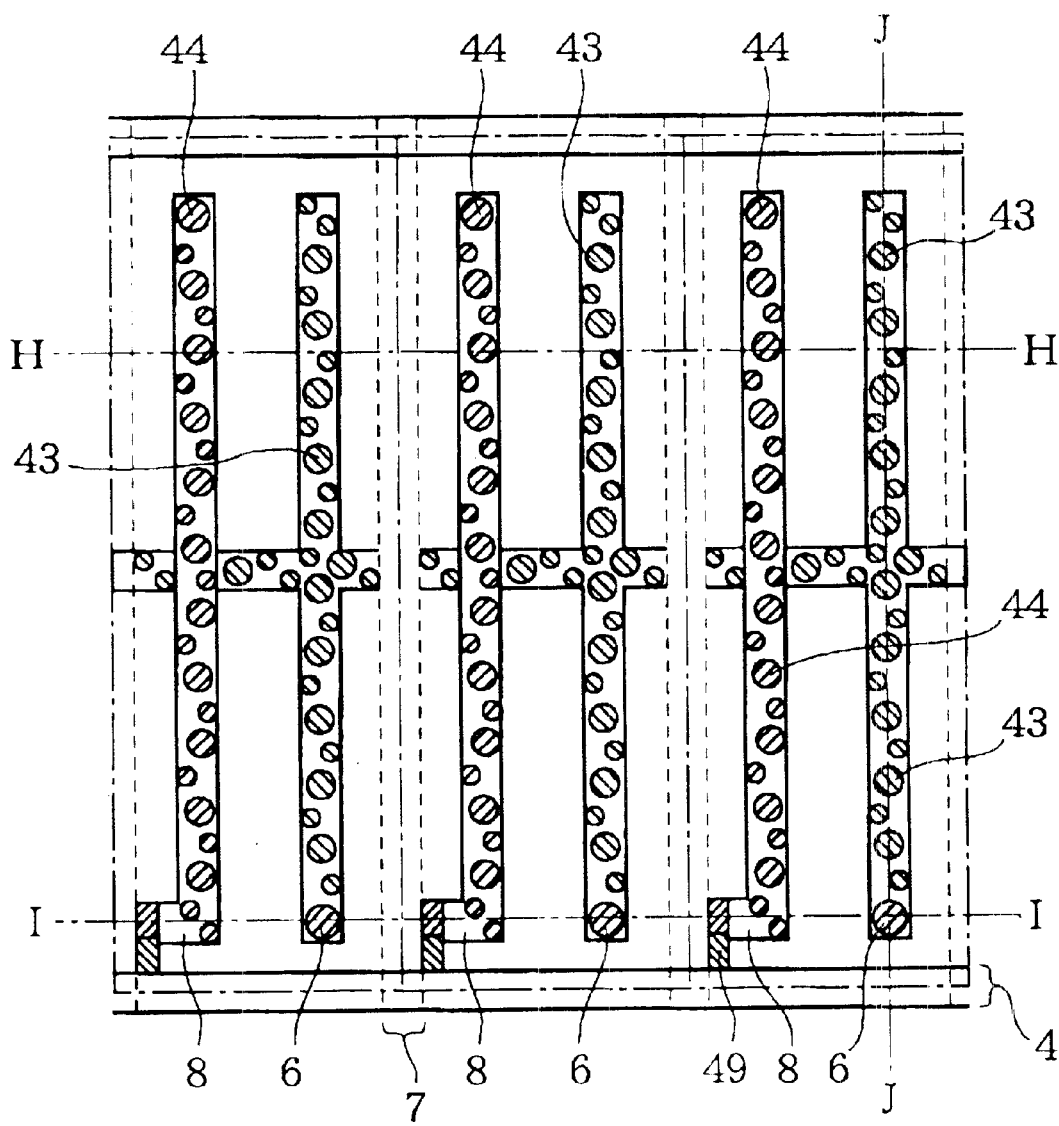
FIG. 49 is a plan view showing the structure of the liquid crystal display element in Example 1 of 3rd Embodiment.
Figure 50:
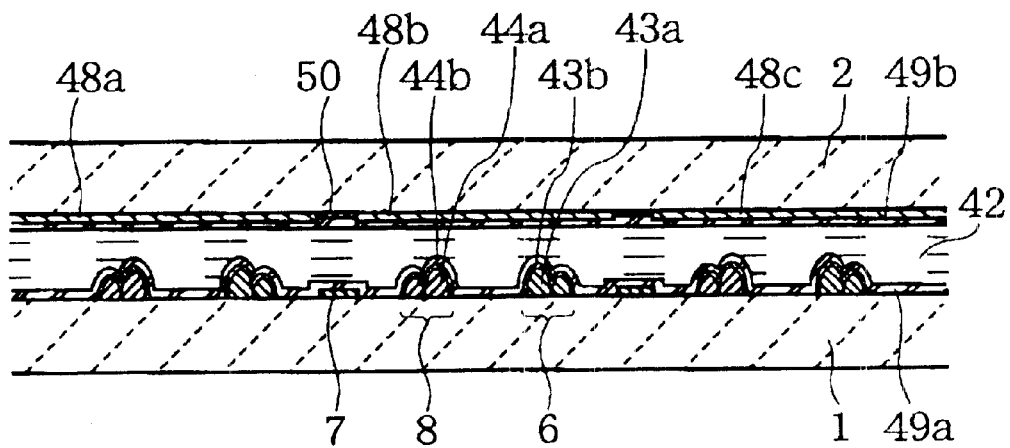
FIG. 50 is a sectional view taken along line H—H of FIG. 49.
Figure 51:
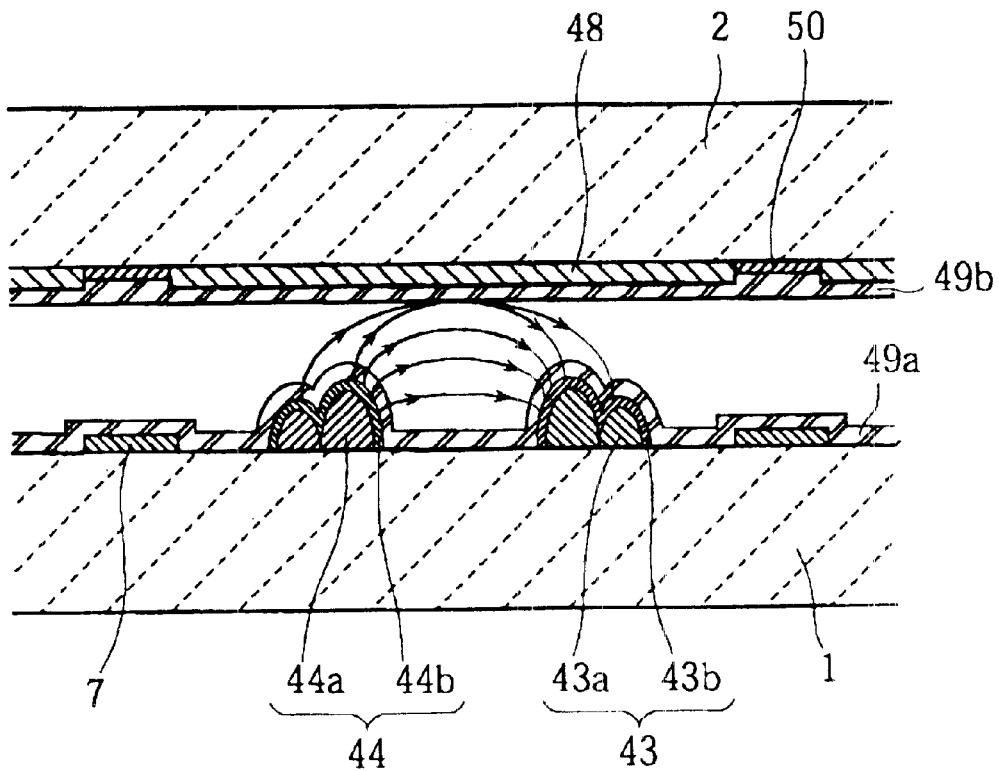
FIG. 51 is an enlarged sectional view showing the pixel part of the liquid crystal display element in Example 1 of 3rd Embodiment.
Figure 52:
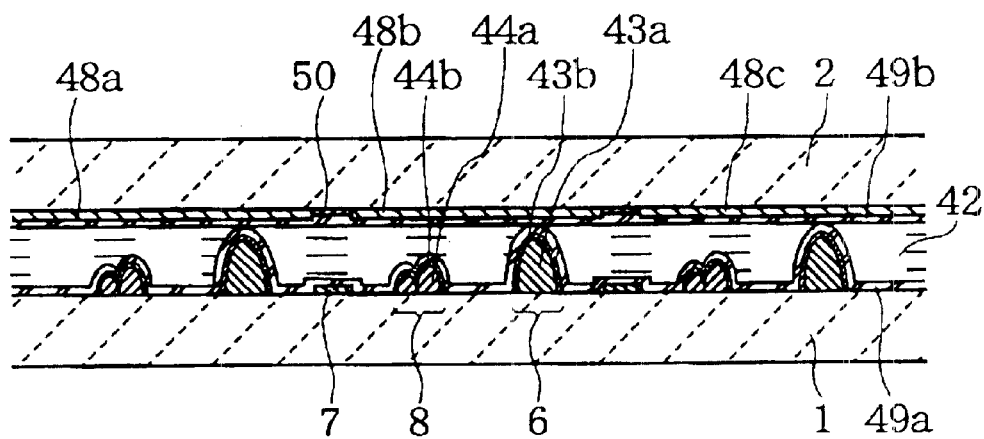
FIG. 52 is a sectional view taken along line I—I of FIG. 49.
Figure 53:
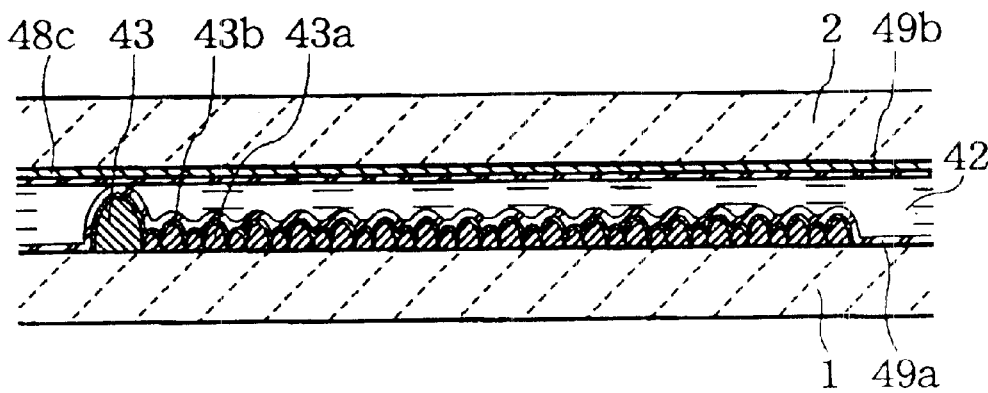
FIG. 53 is a sectional view taken along line J—J of FIG. 49.

Example 1 according to 3 rd Embodiment of the present invention will be described with reference to FIGS. 49 to 53. FIG. 49 is a plan view showing the structure of the liquid crystal display element in Example 1 of 3rd Embodiment; FIG. 50 is a sectional view taken along line H—H of FIG. 49; FIG. 51 is an enlarged sectional view showing the pixel part of the liquid crystal display element in Example 1 of 3rd Embodiment; FIG. 52 is a sectional view taken along line I—I of FIG. 49; and FIG. 53 is a sectional view taken along line J—J of FIG. 49.

In FIGS. 49–53, 1, 2 designate the transparent glass substrates, 42 designates the liquid crystal, 6 designates the common electrode parts, 8 designates the pixel electrode parts, 7 designates the video signal lines connected with the pixel electrode parts 8 to apply video signals thereto, 4 designates the scan signal lines, 49 designates semiconductor switching elements, 48*a* designates a red color filtering material, 48*b* designates a green color filtering material, 48*c* is a blue color filtering material, 49*a* designates an alignment layer formed on an inner surface of the transparent substrate 1, 49*b* designates an alignment layer formed on an inner surface of the transparent substrate 1*b*, and 50 designates a black matrix.

The common electrode parts 6 (three parallel rows of common electrode parts in FIG. 49) each comprise a transparent resin layer 43*a* for forming thereon a number of separate projections 43 and an electrode layer 43*b* formed on the transparent resin layer. Similarly, the pixel electrode parts 8 (three parallel rows of pixel electrode parts in FIG. 49) each comprise a transparent resin layer 44*a* for forming thereon a number of separate projections 44 and an electrode layer 44*b* formed on the transparent resin layer.

The liquid crystal display element having the above-noted structure was produced in the following manner.

First, the scan signal lines 4 that were subjected to patterning with conductive film made of Al and the like are formed on the glass substrate 1 and further an insulation film is formed thereon. Thereafter, the semiconductor switching elements 49 of a-Si and the like and the video signal lines 7 that were subjected to patterning with conductive film of Al and the like are formed on the glass substrate.

Then, the common electrode parts 6 and the pixel electrode parts 8 are patterned into a comb-like form by using an ITO film of transparent conductive material or a conductive film of Al and the like, to be more specific, a large number of separate projections are formed by the transparent resin layers 43*a* and 44*a* made of photosensitive resin. The projections, which are of numerous and fine, may be formed into a predetermined shape by patterning them with a photo mask. After the transparent resin layers 43*a* and 44*a* were formed into a predetermined form in this way, the electrode layers 43*b* and 44*b* are formed on the transparent resin layers 43*a* and 44*a* by using the ITO film of the transparent conductive material.

Subsequently, after the red color filtering material 48*a*, the green color filtering material 48*b*, the blue color filtering material 48*c* and the black matrix 50 were patterned into a predetermined pattern on the glass substrate 2, the alignment layers 49*a*, 49*b* made of polyimide and the like are formed on the glass substrates 1, 2 so as to array the liquid crystal 42 molecules. Thereafter, the glass substrate 2 is arranged in opposition to he glass substrate 1. Each glass substrate 1, 2 is already subjected to rubbing in a predetermined direction.

Finally, after the glass substrates were bonded together around their peripheries by sealing agent, the liquid crystal 42 is injected into the space between them and then the space is sealed off. The horizontal electric field application mode of liquid crystal display element was produced in this manner.

In the liquid crystal display element thus produced, the semiconductor switching elements 49 are subjected to on-off control under driving signals entered from the video signal lines 7 and the scan signal lines 4. The electric field is generated by a voltage applied across the pixel electrode parts 8 connected with the semiconductor switching elements 49 and the common electrode parts 6, so that the liquid crystals 42 are changed in orientation to control the brightness of the pixels, so as to display the image. FIG. 51 shows electric field distribution generated between the common electrode parts 6 and the pixel electrode parts 8 when a driving voltage input through the video signal lines 7 and the scan signal lines 4 is applied to the pixel electrode parts 8 in this Example. Arrows indicate an electric line of flux.

A large number of projections 43 . . . , 44 . . . arranged on the electrodes as in this Example can allow the horizontal electric field to be generated on and over the electrodes as well, so as to allow the liquid crystal molecules to operate. Also, the common electrode parts 6 and pixel electrode parts 8 formed from the transparent conductive material can allow light to pass through even the parts in which the common electrode parts 6 and the pixel electrode parts 8 are arranged. This can produced improved transmittivity, as compared with the arrangement using the rectangular electrodes.

FIGS. 52 and 53 show a variant in which a part of projections 43 . . . formed on the electrodes are extended up to a predetermined cell gap height.

This variant is quite different from the Example shown in FIGS. 49–51 in that a part of projections 43 . . . doubles as cell gap spacers.

The construction of this variant can eliminate the need for the process step of spraying bead-like spacers and also can prevent the array substrate from being damaged by bead-like spacers moving in the panel or prevent image quality from being deteriorated by reflection of light of the backlight.

In this variant, a photo-alignment process in which alignment is effected under UV light should preferably be used, rather than the conventional rubbing-alignment process in which the prisms of the spacers formed by a part of the convex electrodes cast shadows to cause a possible alignment failure or the prisms may possibly be broken.

EXAMPLE 2

Figure 54:
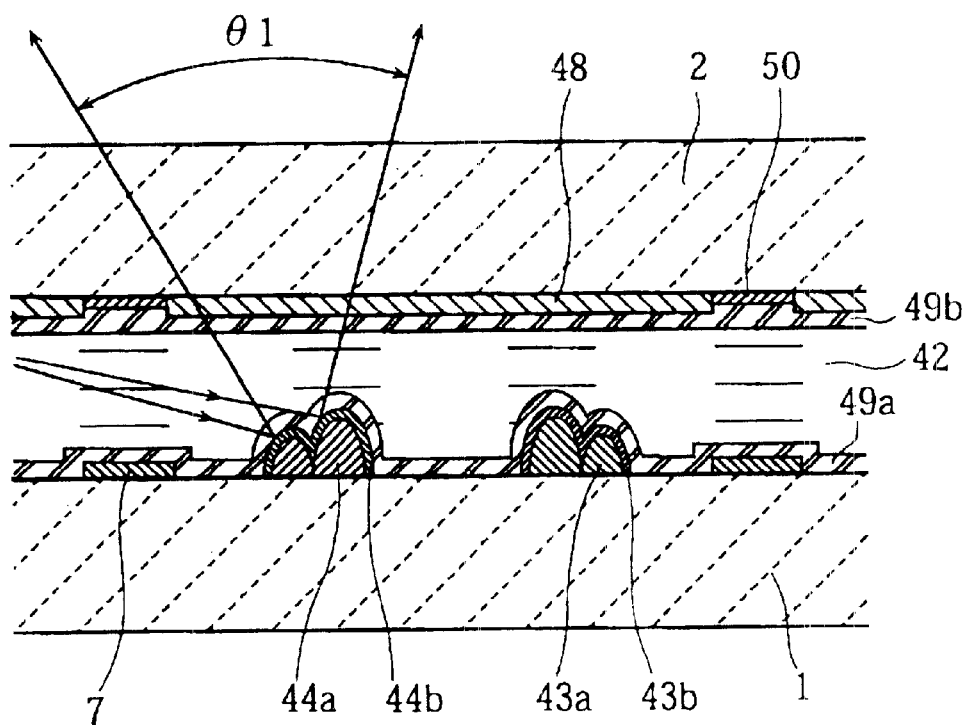
FIG. 54 is an enlarged sectional view showing the pixel part of the liquid crystal display element in Example 2 of 3rd Embodiment.
Figure 55:
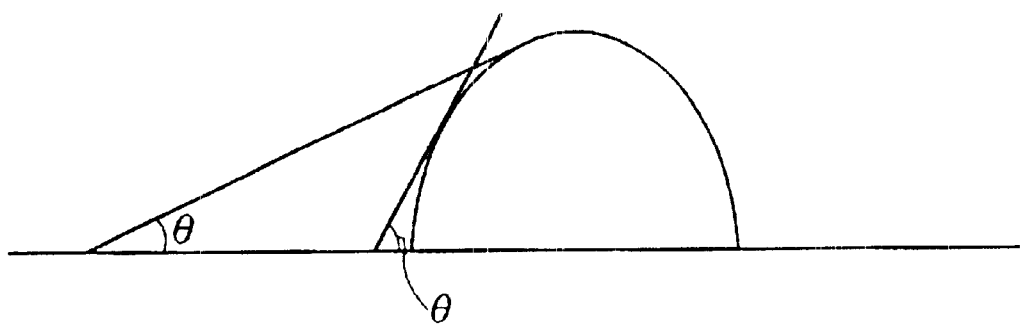
FIG. 55 is an illustration of a cone angle.

Example 2 according to 3rd Embodiment of the present invention will be described with reference to FIGS. 54 and 55. FIG. 54 is an enlarged sectional view showing the pixel part of the liquid crystal display element in Example 2 of 3rd Embodiment; and FIG. 55 is an illustration of a cone angle.

Example 2 is different from Example 1 of 3rd Embodiment in that light reflection functional material is used for the electrode layers 43b and 44b of the common electrode parts 6 and the pixel electrode parts 8.

Example 2 can be identical to Example 1 of 3rd Embodiment in the manufacturing process of the glass substrates 1, 2, the manufacturing process of the panel and the principle of operation for image display, except the types of electrode layer.

Arrows in FIG. 54 indicate the directions for the light entered from the backlight to travel in the interior of the panel.

An assumed backlight is an edge light type using a light guide plate.

The light entering from a light source disposed at a side of the panel into the panel travels while reflecting repeatedly in the interior of the panel and finally outgoes from the panel. The outgoing light is used as illuminating light.

When the electrode layers 43b, 44b are formed of the transparent conductive material, as is the case with Example 1 of 3rd Embodiment, the light entering at an angle smaller than the critical angle passes through as it is and then returns to the backlight side to re-reflect repeatedly. Due to this, reflection loss increases and the utility efficiency of light decreases.

On the other hand, when the electrode layers 43b, 44b of the common electrode parts 6 or the pixel electrode parts 8 are formed of light reflection functional material having high reflectivity, such as Al and Ag, all rays of light incident on those parts are allowed to reflect and outgo from the panel, irrespective of angle of incidence, as shown in FIG. 54. Accordingly, the reflection loss can be decreased and the utility efficiency of light is increased. Likewise, similar effect is obtained for the outside light incident from surrounding environment and thus the utility efficiency of light can further be improved.

Figure 4:
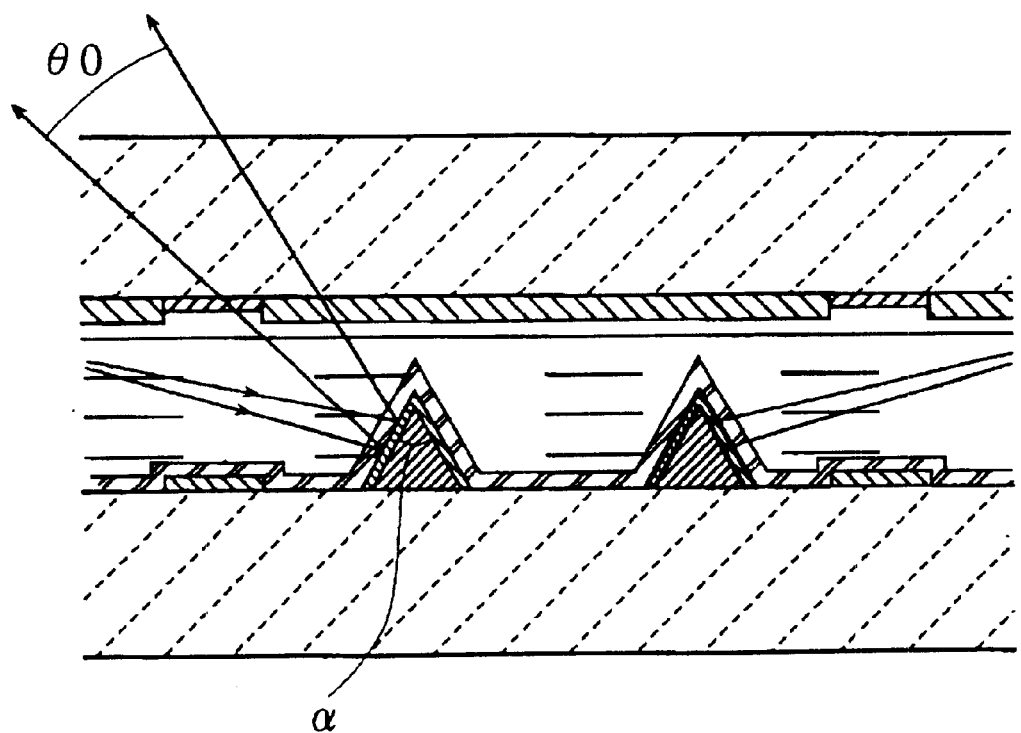
FIG. 4 is an enlarged sectional view showing a pixel electrode part of the conventional liquid crystal display element.

In this Example, the projections 43 . . . of the common electrode parts 6 and those 44 of the pixel electrode parts 8 each have the form of two or more protuberances of different height being combined together and also are each different in cone angle. The terminology of the "cone angle" used in Example 3 means an angle $\theta$ between the tangent of the convex-shaped section from any point and the base, as shown in FIG. 55. The angle $\theta$ 1 in FIG. 54 is an outgoing angle made by rays of light incident on the electrode at two different angles (at the incident angles identical to those of FIG. 4) and outgoing from the panel in this Example.

Comparison of FIG. 54 with FIG. 7 (Prior art) immediately indicates that the outgoing angle $\theta$ 1 of the liquid crystal element of this Example is apparently larger than the outgoing $\theta$ 0 of the conventional liquid crystal display element. This clearly shows that this configuration can produce an expanded outgoing angle range, as compared with the simple inverted V-shaped or U-shaped configuration. Thus, the configuration of this Example can produce the advantageous effect of providing high brightness, while the wide viewing angle which is the feature of the horizontal electric field application (IPS) mode is maintained.

On the other hand, it can be said that in this Example, the incident rays of light reflect diffusely on the reflective surfaces of the common electrodes parts and pixel electrode parts and, as a result of this, the outgoing angle range is expanded, as compared with the simple inverted V-shaped or U-shaped configuration.

EXAMPLE 3

Figure 56:
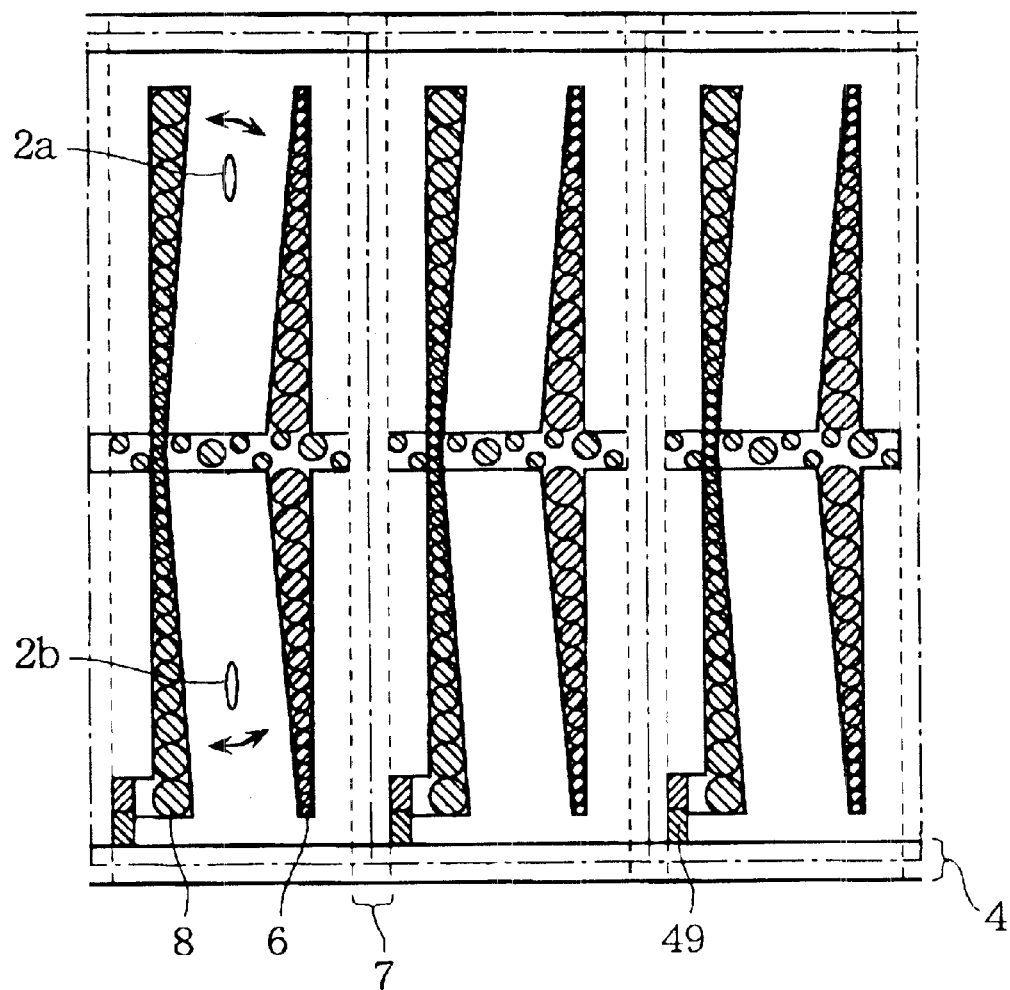
FIG. 56 is a plan view showing the structure of the liquid crystal display element in Example 3 of 3rd Embodiment.
Figure 57:
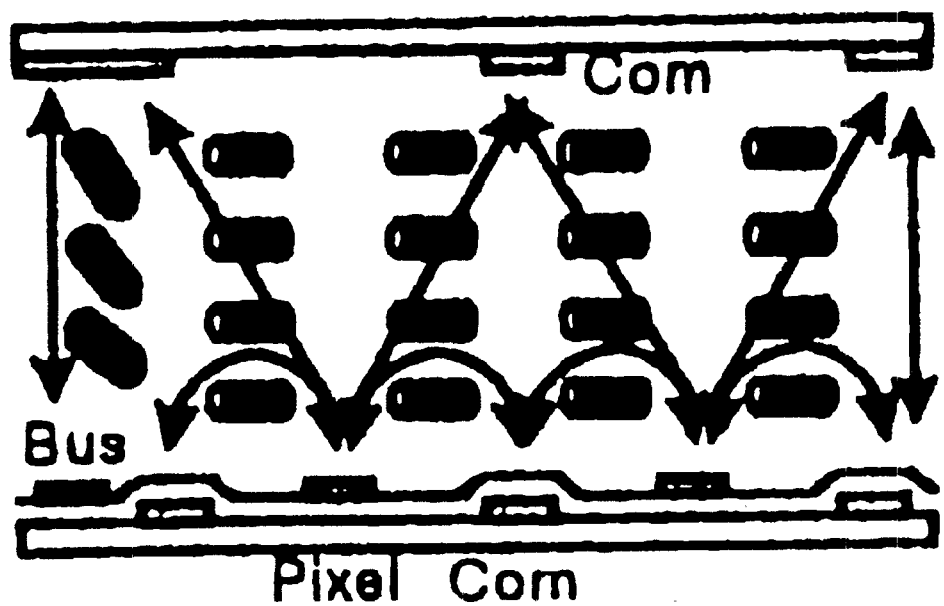
FIG. 57 is an illustration of the Hybrid Switching Mode.

Example 3 according to 3rd Embodiment of the present invention will be described with reference to FIG. 56. FIG. 56 is a plan view showing the structure of the liquid crystal display element in Example 3 of 3rd Embodiment.

Example 3 is different from Example 1 of 3rd Embodiment in that the projections 43 . . . , 44 . . . vary in size in accordance with a distance from the center of the pixel. In particular, this Example is one example in which the projections 43 . . . of the common electrode parts 6 decrease in size in accordance with the distance from the center of the pixel, while on the other hand, the projections 44 . . . of the pixel electrode parts 8 increase in size in accordance with the distance from the center of the pixel.

Example 3 can be fundamentally identical to Example 1 of 3rd Embodiment in the process of producing the glass substrates 1, 2 and the process of producing the pane, except the types of the electrode layers. The projections 43 . . . and 44 . . . of the electrodes can be formed into a predetermined shape and size by a proper choice in designing the mask pattern of photosensitive resin.

When an electric field is generated with application of a voltage across the pixel electrode parts 8 connected with the semiconductor switching elements 49 and the common electrode parts 6, the liquid crystal molecules 2a over the pixel region and those 2b under the pixel region form two regions which are generally equal in area but different in alignment orientation.

With this structure, since a turning direction of the liquid crystal molecules is reversed when a voltage is applied to the liquid crystal molecules 2a, 2b, the shift in color tone is offset with each other and thereby dependency of the color tone due to the orientation can be reduced to a large extent. Thus, the coloring that is caused by the conventional horizontal electric field application mode can be prevented.

OTHER RESPECTS ON STRUCTURE OF EXAMPLES 1 to 3 OF 3RD EMBODIMENT (1) While the projections are formed on both of the common electrodes and the pixel electrodes in Examples 1–3 above, this is not of restrictive. The projections may be formed on the electrodes of at least one of the common electrodes and the pixel electrodes.

(2) While the projections are formed on all of the electrodes in Examples 1–3 above, this is not of restrictive. The projections may be formed on part of the electrodes.

(3) The projections in the respective electrode parts are formed by the transparent resin layers and the electrode layers in Examples 1–3 above, this is not of restrictive. For example, the projections may be formed from the electrode layers only.

While no electrodes are formed on the opposing substrate side (the glass substrate 2 side) in the Examples illustrated above, the electrodes may be formed on the opposing substrate side or alternatively conductive material may be formed thereon, instead of the electrodes.

What is claimed is:

1. A liquid crystal display element comprising liquid crystal material sandwiched between at least a pair of substrates, and pixel electrodes having a plurality of pixel electrode parts and common electrodes having a plurality of common electrode parts formed on at least one of said substrates, said pixel electrode parts and common electrode parts for changing alignment of liquid crystal molecules by applying a voltage across said pixel electrodes and said common electrodes, wherein at least one electrode part of said pixel electrodes and/or said common electrodes comprises a plurality of separate projections and an electrode layer formed thereon and comprising light reflecting material, said projections being formed into a shape that diffusely reflects incident rays of light.

2. A liquid crystal display element according to claim 1, wherein at least one of said projections has a form of two or more protuberances of different height being combined together.

3. A liquid crystal display element according to claim 1, wherein at least two of said projections are each different in cone angle.

4. A liquid crystal display element comprising a liquid crystal panel which comprises first and second substrates and liquid crystal material sealed between said first and second substrates, and a plane of one of said first and second substrates for generating a horizontal (X) electric field for changing alignment of said liquid crystals, wherein said plane additionally comprises a plurality of striped projections and depressions thereon, pixel electrode parts of pixel electrodes and common electrode parts of common electrodes are on alternate side faces of striped projection portions of said striped projections and depressions, and a distance between two adjoining electrode parts at a top of each striped projection part is not more than 6 μm and at least one of said pixel electrode parts and said common electrode parts is transparent.

5. A liquid crystal display element comprising a liquid crystal panel which comprises a pair of substrates and liquid crystal material sealed between said pair of substrates and in which a plane of one of said pair of substrates has alternating pixel electrode parts of pixel electrodes and common electrode parts of common electrodes for changing alignment of liquid crystal molecules by generating a horizontal (X) electric field in said plane, wherein at least one of said pixel electrode parts and said common electrode parts has a tapered section with respect to a horizontal (X) electric field direction and is transparent, and a distance between said alternating pixel electrode parts and common electrode parts is limited to not more than 6 μm.

6. A liquid crystal display element comprising a liquid crystal panel which comprises a pair of substrates and liquid crystal material sealed in between said pair of substrates and in which pixel electrode parts of pixel electrodes and common electrode parts of common electrodes are located alternately on a plane of one of said pair of substrates for changing alignment of liquid crystal molecules by generating a horizontal (X) electric field in said plane, wherein at least one of said pixel electrode parts and said common electrode parts is located on a transparent insulation layer having a tapered section with respect to a horizontal (X) electric field direction and is made of a transparent conductive film; and wherein a distance between said alternating pixel electrode parts and common electrode parts is limited to not more than 6 μm.

7. A liquid crystal display element comprising liquid crystal material sandwiched between at least a pair of substrates, and pixel electrodes comprising a plurality of pixel electrode parts and common electrodes comprising a plurality of common electrode parts, said pixel electrodes and said common electrodes located on at least one of said substrates and for changing alignment of liquid crystal molecules by a voltage applied across said pixel electrodes and said common electrodes, wherein at least one electrode part of said pixel electrodes and/or said common electrodes comprises two or more separate projections, and sizes of said projections are different depending upon the distance between each such projection and a center of a pixel.

8. A liquid crystal display element according to claim 7, wherein on one of said common electrodes and said pixel electrodes said projections increase in size depending upon their distance from a center of said pixel, and on the other of said common electrodes and said pixel electrodes said projections decrease in size depending upon their distance from a center of said pixel.

9. A liquid crystal display element according to claim 7, wherein said two or more separate projections are of differing heights.

* * * * *

UNITED STATES PATENT AND TRADEMARK OFFICE
CERTIFICATE OF CORRECTION

PATENT NO. : 6,583,840 B1  
DATED : June 24, 2003  
INVENTOR(S) : Kazuo Inoue et al.

It is certified that error appears in the above-identified patent and that said Letters Patent is hereby corrected as shown below:

<u>Title page, Item [54] and Column 1, lines 1-4,</u>
Change the title to read:
-- LIQUID CRYSTAL DISPLAY ELEMENT AND PRODUCING METHOD THEREOF --.

Signed and Sealed this

Sixteenth Day of December, 2003

JAMES E. ROGAN
*Director of the United States Patent and Trademark Office*